United States Patent [19]

Papa

[11] 4,070,313
[45] Jan. 24, 1978

[54] NON PUNKING PHENOLIC FOAM

[75] Inventor: Anthony Joseph Papa, St. Albans, W. Va.

[73] Assignee: Union Carbide Corporation, New York, N.Y.

[21] Appl. No.: 649,815

[22] Filed: Jan. 16, 1976

[51] Int. Cl.$^2$ .............................................. C08J 9/14
[52] U.S. Cl. ............................. 260/2.5 F; 260/2.1 C; 260/2.2 C; 260/2.5 FP; 260/31.2 T; 260/32.8 R; 260/32.8 SB; 260/33.4 R; 260/33.8 R; 260/60; 260/826
[58] Field of Search ............................. 260/2.5 F, 826

[56] References Cited

U.S. PATENT DOCUMENTS

| | | | |
|---|---|---|---|
| 2,911,381 | 11/1959 | Roth | 260/2.5 B |
| 2,911,382 | 11/1959 | Barkhuff, Jr. et al. | 260/2.5 B |
| 3,271,331 | 9/1966 | Ender | 260/2.5 F |
| 3,389,094 | 6/1968 | D'Alessandro | 260/2.5 F |
| 3,839,384 | 10/1974 | Morehouse | 260/2.5 AH |
| 3,914,191 | 10/1975 | Scott | 260/2.5 B |

*Primary Examiner*—Morton Foelak
*Attorney, Agent, or Firm*—Marylin Klosty

[57] ABSTRACT

Phenolic foam having improved punking resistance is obtained by effecting the formation of phenolic foam in the presence of an aralkyl-modified polyalkylsiloxane. Used with particular advantage as non punking additives to phenolic foam formulations are polymethylsiloxane oils in which silicon is additionally bonded to phenylethyl groups.

26 Claims, No Drawings

NON PUNKING PHENOLIC FOAM

FIELD OF THE INVENTION

The present invention relates generally to the foaming of base-catalyzed condensation products derived from a phenol and an aldehyde such as, for example, phenolformaldehyde resoles. More particularly, the invention is concerned with the formation of phenolic foam which is non punking.

BACKGROUND OF THE INVENTION

It is well known to the art that condensation of a phenol and an aldehyde provides materials curable to thermoset phenolic resins. Base-catalyzed condensation employing at least about a stoichiometric amount of aldehyde provides condensates known as resoles whereas acid catalysts and a deficiency of aldehyde provides novolacs. Characteristic of both liquid and solid resoles is their heat-curability to fully cross-linked, infusible products without the need for an added cross-linking agent. From this standpoint, resoles are more descriptively referred to as One-Step phenolic resins in contract to novolacs or Two-Step resins which do require the addition of a cross-linking agent for the curing process. The reactivity of resoles and ability to self-condense to higher molecular weight resins is attributable to the presence of hydroxymethyl groups which become bonded to the aromatic phenolic nucleus during the base-catalyzed condensation. From the standpoint of commercial application, the most significant resoles are those derived from phenol itself and formaldehyde.

Curing of resoles to higher molecular weight, crosslinked thermoset resins proceeds with generation of heat and is accelerated by acid materials. In the presence of strongly acidic accelerators of the exothermic reaction and a source of blowing action, liquid resoles cure rapidly to cellular phenolic resins. Although not essential to the formation of phenolic foam, it is usual practice to include a surface active agent as additional component of the phenolic foam formulation. Among the surface active agents described in the literature as suitable stabilizers of phenolic foam are the siloxane-oxyalkylene copolymers described in U.S. Pat. No. 3,271,331. These copolymers are comprised of: (1) a siloxane portion in which silicon atoms have a monovalent hydrocarbon group bonded thereto; and (2) an oxyalkylene portion consisting essentially of at least one oxyalkylene group. In the oxyalkylene portion of such stabilizers, an oxygen atom is bonded to carbon of a bivalent hydrocarbon group, the second valence of the bivalent group being bonded to silicon of the siloxane portion of the copolymer. Among the variety of monovalent hydrocarbon groups which can be bonded to silicon of the siloxane portion of such copolymers are alkyl groups such as methyl, aryl groups such as phenyl and aralkyl groups such as benzyl and phenylethyl.

Although phenolic foams are used to embed floral arrangements and for general packaging purposes, they have not found the widespread industrial application enjoyed by cellular polyurethanes. As compared with cellular polyurethanes, phenolic foams possess better inherent resistance to burn with an open flame, and emit very low levels of smoke on heating. Consequently, greater attention is being focused on phenolic foam technology so as to develop practical products having more widespread end-use applications. Among the undesirable properties of phenolic foams generally, is their ability to undergo a flameless combustion when heated to their decomposition temperature. This phenomenon is commonly referred to as punking and may be likened to the glowing of charcoal briquettes. Although temperatures well in excess of 500° C. are necessary to initiate punking of phenolic foam, once started the hazardous punking or afterglow state is self-sustaining and sometimes foam temperatures as high as 1700° C. are reached. The punking properties of phenolic foam is recognized in the prior art and a number of methods for achieving punking resistance have been reported. For example, production of non punking foams has been previously reported in U.S. Pat. No. 3,298,973 by the employment of a particular catalyst mixture of at least two acidic agents. The catalyst is a solid mixture of boric acid, or its anhydride, and an organic hydroxy acid in which the hydroxy group is on a carbon atom not more than one carbon atom removed from a carboxyl group. Punking of phenolic foams is also inhibited by the incorporation of certain organophosphorus compounds described in U.S. Pat. No. 3,673,130. Unfortunately, these techniques have a number of drawbacks. One is that they generally require relatively high quantities of the non punking component. Further, the aforementioned catalyst mixture based on boric acid or its anhydride is a solid which hampers handling and foam processability in that it is relatively difficult to disperse the solid catalyst into the liquid resole quickly and uniformly so as to achieve an even foam rise. Among the drawbacks associated with organophosphorus compounds as non punking additives is that they are, in general, expensive and inefficient from the standpoint that relatively high concentrations thereof (such as, for example, 5 to 20 parts, and usually at least 15 parts per 100 parts of resole) are required to impart punking resistance.

It is desirable, therefore, and is a primary objective of this invention to provide an improved method for the formation of phenolic foam having improved punking resistance.

Another object is to provide non punking phenolic foam by the use of a material which is both normally liquid and effective at relatively low concentrations.

Various other objects and advantages of this invention will become apparent to those skilled in the art from the accompanying description and disclosure.

SUMMARY OF THE INVENTION

It has been discovered that phenolic foam of improved punking resistance can be produced according to the present invention by employing, as a component of phenolic foam forming reaction mixtures, aralkyl-polyalkylsiloxanes as more fully defined hereinafter.

In accordance with one aspect of the teachings of this invention, mixtures are provided containing a phenolaldehyde resole and an aralkyl-polyalkylsiloxane. The present invention also provides a method for producing phenolic foam of improved punking resistance which method comprises polymerizing a phenol-aldehyde resole in the presence of an acid accelerator for the polymerization of the resole, a blowing agent, and the aralkyl-polyalkylsiloxanes described herein.

The aralkyl-modified siloxanes employed in the practice of the present invention cosist essentially of: (1) monofunctional siloxy units (M°) the respective silicon atoms of which have two alkyls bonded thereto, the third silicon-bonded organic group being alkyl or aralkyl (Q); (2) an average of from about one to about 200 moles of difunctional dialkylsiloxy untis (X) for every two moles of M°; and (3) from zero up to an average of about 100 moles, for every two moles of M°, of difunctional monoalkylsiloxy units (Y) in which the second organic group bonded to silicon is aralkyl (Q), provided an average of at least about 0.5 and no more than about 100 moles of aralkyl groups (Q) are present in the siloxane for every two moles of M°.

As indicated, the essential silicon-bonded aralkyl groups of the siloxanes employed in the practice of the present invention are collectively referred to herein by the symbol "Q" and include any of the monovalent hydrocarbon radicals encompassed by the formula,

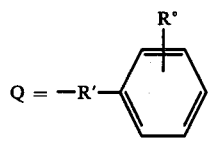

where: R' is bivalent alkylene having from two to three carbon atoms; and R° is hydrogen or methyl.

The remaining organic groups bonded to silicon of the siloxanes employed in forming phenolic foam as described herein are alkyls, and are designated by the symbol "R". As defined for the purpose of the entire specification, the symbol "R" denotes alkyls of one to four carbon atoms.

In the monofunctional siloxy units encompassed by M°, the respective silicon atoms are bonded to two alkyls (R), the third silicon-bonded organic group being aralkyl (Q) or alkyl (R). Thus, included within the scope of M° are monofunctional siloxy units having the following unit formulae which for brevity are also individually referred to herein as the M and M' units as shown:

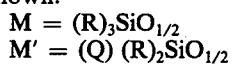

In any given siloxane composition employed in the practice of the present invention, the M° units may be the same as or different from one another.

In the difunctional siloxy units, at least one of the two organic groups bonded to the respective silicon atoms is alkyl and the second silicon-bonded organic group is either alkyl as in the X units or the aforesaid aralkyl group (Q) as in the Y units when the latter units are present. Thus, the difunctional X and Y units have the following respective unit formulae:

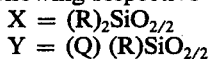

The aralkyl-modified polyalkylsiloxanes may contain any combination of subcombination of the respective siloxy units within the scope of M°, X and Y, provided the average composition contains from about one to about 200 moles of X and from about 0.5 to about 100 moles of Q for every two moles of M°. Usually, the aralkylpolyalkylsiloxanes employed in providing phenolic foam as described herein contain, on the average, from about 1.5 to about 100 moles of X units and no more than about 50 moles of Q, for every two moles of M°.

Consistent with the above definitions and, from the standpoint of the nature and relative proportion of monomeric siloxy units, the aralkyl-polyalkylsiloxane component of the blends and reaction mixtures of the present invention have the following average composition, as expressed on the normalized basis of a total of two moles of monofunctional units (M°), that is, per average mole of polymer:

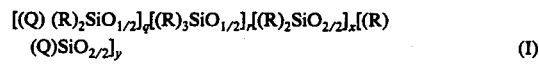   (I)

wherein:
Q is silicon-bonded aralkyl as previously defined;
R is alkyl of one to four carbon atoms;
q is zero or any positive number having an average value of no more than two, r is zero or any positive number having an average value of no more than two, and the average value of the sum $q+r$ is two;
x has an average value from about one to about 200; and
y is zero or any positive number having an average value of no more than about 100, provided the average value of the sum $q+y$ is at least about 0.5 and no more than about 100.

It is evident, therefore, that the sum $q+y$ corresponds to the total number of aralkyl or Q groups contained in an average mole of polymer and that when either $q$ or $y$ is zero, the other must be at least 0.5. It is also evident that when both $q$ and $r$ are positive numbers, both types of the respective monofunctional units are present in the siloxane.

In addition to the phenolic resole and aralkyl-polysiloxane components, for most end use applications of the phenolic foams produced in accordance with the present invention, including their use for general insulation purposes, the other essential components of the foam formulation include an acidic catalyst and a blowing agent as more fully described hereinafter.

DETAILED DESCRIPTION OF THE INVENTION AND PREFERRED EMBODIMENTS

1. The Aralkyl-Polyalkylsiloxanes

The aralkyl-polyalkylsiloxane fluids employed in the formation of phenolic foam in accordance with the teachings of the present invention can be discrete chemical compounds although they are usually mixtures of discrete siloxane species which differ in molecular weight and in the type, arrangement and relative proportions of units. Therefore, as expressed herein, the parameters employed to denote the relative properties of units (e.g., x and y) are average values. It is to be further understood that, consistent with convention in the polysiloxane art, as expressed herein, the formulas of the siloxane polymers indicate their overall average empirical composition rather than any particular ordered arrangement of units or molecular weight of any particular discrete siloxane species. With this understanding, the average composition of the respective types of aralkyl-polyalkylsiloxanes encompassed by Formula I above may be expressed by the following formulae wherein the various siloxy units are shown in chemically combined form:

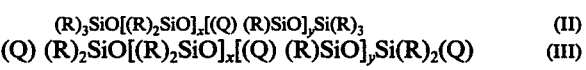

wherein: the average value of x ranges from about one to about 200, and is usually at least about 1.5 and no more than about 100; the total average number of aralkyl or Q groups is from about 0.5 to about 100 and is usually no more than about 50; and, Formula IV, $q$ and $r$ are positive numbers provided their sum is two. It is evident, therefore, that: (1) in Formula II, the average value of $y$ is at least about 0.5 and no more than about 100; (2) in Formula III, $y$ can be zero or any positive number up to about 98; and (3) in Formula IV, the average value of $q+y$ is from 0.5 to about 100, the maximum value of $y$ being 100 less the value of $q$. For example, in Formula IV, when $q$ is 0.5 (and thus $r$ is 1.5), $y$ may be zero, 0.1, 0.5, 0.8, 1.2, 1.9, 50 and so forth up to a maximum value of 99.5. Further in regard to Formula IV, it is also evident that when $q$ has a value of less than 0.5 such as 0.25, the polymer must contain Y units and the corresponding minimum average value of $y$ is 0.25.

Generally, the ratio of the total moles of the difunctional dialkysiloxay units encompassed by X to the total moles of aralkyl or Q groups ranges from about 4:1 to about 0.75:1. Usually, the mole ratio of X units to Q groups is from about 3:1 to about 1:1.

The silicon-bonded R groups are alkyls having from one to four carbon atoms including linear and branched alkyls. Illustrative of suitable groups encompassed by R are: methyl, ethyl, n-propyl, isopropyl, n-butyl and t-butyl. Of these, methyl is especially suitable. It is to be understood that the R groups may be the same throughout the siloxanes or they may differ as between or within units. For example, when the endblocking monofunctional units are M, that is, $(R)_3SiO_{1/2}$-, they may be trimethylsiloxy units and the difunctional units, $R_2SiO_{2/2}$, may be diethylsiloxy, methylethylsiloxy units, or any combination of such units.

The silicon-bonded aralkyl or Q substituents of the polysiloxanes employed in the practice of the present invention may be of the following:

1. phenylethyl, that is,

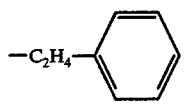

which term and formula are used in their generic sense to designate alpha-phenylethyl,

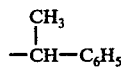

or beta-phenylethyl, —CH$_2$CH$_2$—C$_6$H$_5$;

2. tolylethyl, that is,

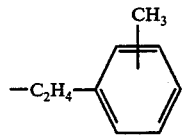

which term and formula are used in their generic sense to designate alpha-tolylethyl or beta-tolylethyl, as well as tolyl groups wherein methyl of the tolyl group is bonded to any one of the carbon atoms in the 2 through 6 positions of the benzene nucleus;

3. phenylpropyl, that is,

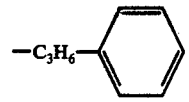

which term and formula are used in their generic sense to designate gamma-phenylpropyl, —CH$_2$CH$_2$CH$_2$—C$_6$H$_5$, beta-phenylpropyl,

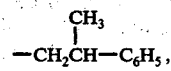

or alpha-phenylpropyl,

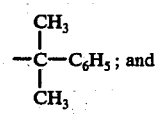

4. tolylpropyl, that is,

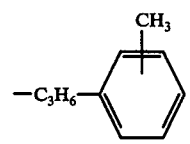

which term and formula are used in their generic sense to designate alpha-, beta- or gamma-tolylpropyl groups wherein methyl of the tolyl group can be bonded to any of the carbon atoms in the 2 through 6 positions of the ring.

It is to be understood that suitable siloxanes for use in the practice of this invention include polymers containing any combination of aralkyl-dialkylsiloxy end-blocking units (M′) and aralkyl-monoalkylsiloxy units (Y). Further, the aralkyl group may be the same throughout the polymer or the polymer may contain any combination of the various aralkyls encompassed by Q.

Illustrative of suitable aralkyl-polyalkylsiloxanes for use in the practice of the present invention are:

1. trimethylsiloxy end-blocked (phenylethyl)methylsiloxy dimethylsiloxane oils;

2. trimethylsiloxy end-blocked (phenylpropyl)methylsiloxy dimethylsiloxane oils;

3. trimethylsiloxy end-blocked (tolylethyl)methylsiloxy dimethylsiloxane oils;

4. (phenylethyl)dimethylsiloxy end-blocked dimethylsiloxane oils;

5. (phenylpropyl)dimethylsiloxy end-blocked dimethylsiloxane oils;

6. trimethylsiloxy end-blocked (phenylethyl)methylsiloxy (phenylpropyl)methylsiloxy dimethylsiloxane oils;

7. trimethylsiloxy end-blocked (phenylethyl)methylsiloxy methylethylsiloxy dimethylsiloxane oils;

8. (phenylethyl)dimethylsiloxy end-blocked (phenylethyl)methylsiloxy dimethylsiloxane oils; and 9. trimethylsiloxy/(phenylethyl)dimethylsiloxy end-blocked (phenylethyl)ethylsiloxy dimethylsiloxane oils.

A preferred class of aralkyl-polyalkylsiloxanes for use in providing non punking phenolic foam as described herein are those having the following average composition,

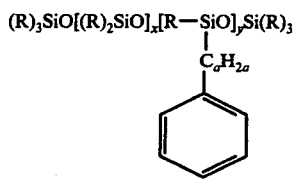

(V)

wherein: R, as previously defined, is alkyl of one to four carbon atoms; $a$ has a value of two or three; $x$ has an average value from about 1.5 to about 100; and $y$ has an average value from about 0.5 to about 50. Especially effective as non punking additives to phenolic foam formulations are the trimethylsiloxy end-blocked phenylethyl-substituted dimethylsiloxanes encompassed by Formula V, that is, those polymers wherein $a$ is 2 and R is methyl or ethyl.

A particularly preferred class of aralkyl-polyalkylsiloxanes for use in providing non punking phenolic foam as described herein are those having the following average composition,

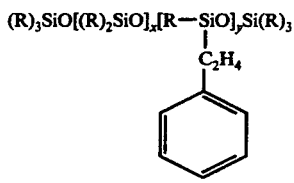

(VI)

wherein: R is methyl or ethyl; $x$ has an average value from about 2 to about 80; and $y$ has an average value from about 1 to about 40. The ratio of $x:y$ is usually from about 3:1 to about 1:1.

The aralkyl-polyalkylsiloxanes employed in the practice of the present invention are normally liquid polymers and, in general, have viscosities from about 4 to about 30,000 or more centistokes at 25° C. Such oils can be produced by any number of reactions well known to the siloxane chemistry art including equilibration, hydrosilation and cohydrolysis/cocondensation reactions. For example, in accordance with the equilibration technique, an octaalkylcyclotetrasiloxane, a hexaalkyldisiloxane and a tetra(aralkyl)tetraalkylcyclotetrasiloxane are equilibrated in an acidic or basic medium in relative proportions corresponding to the predetermined relative proportions of siloxy units desired in the final product. A second method comprises the reaction of a polyalkylsiloxane hydride with styrene, alpha-methylstyrene or corresponding olefinically unsaturated derivatives of toluene, in the presence of a platinum hydrosilation catalyst such as chloroplatinic acid. The aralkyl-substituted siloxane oils can also be prepared by the cohydrolysis and cocondensation of a dialkyldichlorosilane, an aralkyl-alkyldichlorosilane and a trialkylchlorosilane. Suitable siloxanes containing aralkyl-dialkylsiloxy end-blocking units (that is, M' units) can be prepared, for example, by effecting the cohydrolysis/cocondensation reactions in the presence of an aralkyl-dialkylchlorosilane in place of, or in addition to, the trialkylchlorosilane. These various methods, as well as respective classes of aralkyl-polyalkylsiloxanes within the scope of those employed in the practice of the present invention, are described and claimed in U.S. Pat. Nos. 3,221,040 and 3,839,384. The particular class and illustrative examples of low molecular weight aralkyl-modified polyalkylsiloxane oils described in said U.S. Pat. No. 3,839,384 ae incorporated herein as part of the present disclosure by reference to said patent. Likewise, the particular aralkyl-siloxane oils described in said U.S. Pat. No. 3,221,040 are also incorporated herein as part of the present disclosure by reference thereto.

2. The Phenolic Resole

The use of the aralkyl-polyalkylsiloxanes in the formation of phenolic foam as described herein is applicable to any liquid resole derived from base-catalyzed condensate of a phenolic compound and an aldehyde. In addition to phenol itself, other compounds having a phenolic hydroxyl group (i.e., —OH bonded directly to a benzene nucleus) and from two to three unsubstituted ring carbon atoms in the ortho and para position to the phenolic hydroxyl group are suitable. Such compounds include mononuclear phenolic compounds as well as polynuclear phenolic compounds, that is, compounds having more than one benzene nucleus to which a phenolic hydroxyl group is bonded. For example, suitable mononuclear phenols are those compounds encompassed by the general formula,

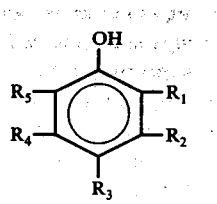

where $R_1$ through $R_5$ are hydrogen, hydroxyl or alkyl including any combination thereof, provided at least two of $R_1$, $R_3$ and $R_5$ are hydrogen. When present, the alkyl groups may have from one up to twenty carbon atoms. Illustrative of suitable compounds encompassed by the above formula are any of the following: phenol; resorcinol; catechol; ortho-, meta-, and para-cresols; 2,5-, 3,4- and 3,5-xylenols; 3-ethylphenol; 3,5-diethylphenol; and conventional para-substituted alkylphenols such as p-tert-butylphenol, p-amylphenol, p-nonylphenol, p-dodecylphenol, p-tetradecylphenol, p-octadecylphenol; and the like.

Illustrative of suitable dinuclear phenolic compounds are: 2,2-bis-(4-hydroxyphenyl)propane, 2,2-bis(4-hydroxyphenyl)butane, and 2,2,-bis(4-hydroxy-3-methylphenyl)propane, which are also known to the art as Bisphenol A, B and C, respectively. Illustrative of other suitable polynuclear phenolic reactants are the following tri- and tetranuclear compounds which are the respective reaction products of phenol and acrolein (3:1 mole ratio) and of phenol and glyoxal (4:1 mole ratio):

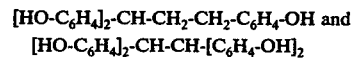

wherein the alkylidene bridging groups are linked to the respective benzene nuclei at the carbon atoms para to phenolic hydroxyl.

It is to be understood that any of the above phenolic reactants including phenol itself, may be used individually or in combination. Usually, however, the para-substituted alkylphenols and/or polynuclear phenolic compounds are used in combination with phenol. Also suitable for use in combination with phenol are one or more beta-phenylethyl substituted phenols such as, for example, 2-(beta-phenylethyl)phenol, 4-(beta-phenylethyl)- phenol, 2,4-(beta-phenylethyl)phenol and other such isomeric compounds. When phenol is used in combination with other phenolic compounds such as, for example, the aforementioned alkylphenols, beta-phenylethylphenols and polynuclear phenols, the additional phenolic compound is usually used in an amount of no more than about 50 parts by weight per 100 parts by weight of phenol.

In addition to formaldehyde, other aldehydes which are useful in forming condensates from which phenolic resoles useful in the practice of the invention may be derived are: glyoxal, acetaldehyde, chloral, furfural and benzaldehyde. Further, formaldehyde may be used as free formaldehyde, usually added in aqueous solution, or in the form of its low molecular weight polymers such as paraformaldehyde or in the form of other substances capable of providing free formaldehyde under the condensation reaction conditions described herein. It is to be understood that any of the aforesaid aldehydes including formaldehyde may be used individually or in combination.

The phenolic compound and aldehyde such as, in particular, phenol and formaldehyde, are condensed at a molar ratio of aldehyde:phenolic compound of from about 1:1 to about 3:1. In the formation of phenol-formaldehyde condensates, the formaldehyde is added to the reaction system as an aqueous solution containing from about 3.5 to about 45 weight percent HCHO. The relative proportions of phenol and formaldehyde are also often expressed in terms of formaldehyde factor which defines the parts by weight of aqueous formaldehyde solution charged to the reaction zone per 100 parts by weight of total phenolic compound. The value of the formaldehyde factor varies depending upon the content of formaldehyde in the particular aqueous solution employed. As expressed on the basis of 37 weight percent aqueous formaldehyde, the factor is usually between about 100 and about 190, and is more usually between about 110 and about 180.

The condensation of the phenolic compound and aldehyde is effected in the presence of an alkaline metal catalyst such as hydroxides, oxides, carbonates and bicarbonates of any of the alkali metal and alkaline earth metals. Illustrative of suitable catalysts are the respective hydroxides of lithium, sodium, potassium, rubidium, cesium, francium, barium, calcium and magnesium, as well as potassium and sodium carbonates, bicarbonates, calcium oxide, and the like. The concentration of alkaline metal catalyst may vary over a relatively wide range such as between about 0.1 and about 10, and is usually no more than about 5, parts by weight per 100 parts by weight of total phenolic compound fed to the reaction zone.

The condensation reaction is generally effected at temperatures between about 60° and about 110° C. and more usually between about 65° C. and about 100° C. The reaction may be effected at atmospheric pressure although usually reduced pressure such as between about 150 and about 650 mm. mercury is used. The pressure is adjusted consistent with the desired reaction temperature. Condensation time may vary between about 0.5 and about 15 hours, and is usually no more than about 10 hours.

The alkaline condensate is aqueous, the water content thereof generally ranging between about 10 and about 60 weight percent, and is usually no more than about 40 to 50 weight percent. Water is introduced to the system with the catalyst which is preferably added as a preformed aqueous solution and, when formaldehyde is used as the aldehyde reactant, water is also introduced as the carrier medium for the formaldehyde. Varying amounts of water are also formed as by-product of the condensation reaction. In regard to resoles to be employed in the formation of phenolic foam it is desirable that the final resole product have a water content of no more than about 10 weight percent. Concentration of liquid condensate to a particular predetermined water content is readily accomplished by conventional stripping at reduced pressure such as, for example, at a reduced pressure from about one to about 200 mm. mercury, and at temperatures from about 30° to about 75° C., or by any other technique known to the art of resole formation.

The alkalinity of the condensation products is due to the presence of the alkaline condensation catalyst and is dealt with in a variety of ways. One method, which is conventional, is to neutralize the basic condensate by the addition thereto of an acidic compound such that the pH of the resole product is between about 5.2 and about 7. Illustrative of acidic compounds reported in the literature as suitable for this purpose include phosphoric acid, hydrochloric acid and sulfuric acid. Depending upon any one or more of a number of factors such as the particular alkaline catalyst employed, the acidic compound added for neutralization thereof and the water content of the resole, the salt of neutralization may remain solubilized in the resole product or some portion thereof may precipitate. In the latter event, filtration or other liquid-solids separation technique, is required to separate the precipitated salts. In the commercial manufacture of many grades of phenol-formaldehyde resoles supplied as foamable resins, filtration is avoided by the employment of barium hydroxide which, when neutralized with sulfuric acid, forms a salt which does not precipitate and is left in the product.

It is to be understood that, as used herein, expressions such as "conventional resoles," "resoles of the conventional type" and the like, have reference to resoles produced by methods in which alkaline phenolaldehyde condensates are treated by the addition thereto of neutralizing compounds thereby forming salts. Such resole compositions are generally associated with poor shelf-life and are, as recommended by the manufacturer, maintained under refrigeration (about 5° to 7° C.) during shipment and storage prior to use.

The use of the aralkyl-polyalkylsiloxanes as described herein is applicable to the formation of phenolic foam from the above-described conventional resoles, any other type of resole described in the literature, and to the novel phenol-aldehyde resoles described in my prior and copending application Ser. No. 595,744, filed July 14, 1975, now U.S. Pat. No. 4,033,909. The resoles described in said application are referred to herein as the "ion exchanged resoles" which term denotes that they are free of ionic species capable of being removed by the free acid form of a cation exchange resin and by the free base form of an anion exchange resin. They are prepared by the method which comprises treatment of liquid condensate formed by the alkaline metal catalyzed reaction of a phenolic compound and an aldehyde under the above-described condensation conditions, with the free acid form of a cation exchange resin and the free base form of an anion exchange resin. In marked contrast to the poor shelf-life of the above-described conventional resoles, the ion exchanged resoles described in said copending application retain their reactivity as foamable compositions for far greater periods of time at ordinary ambient temperatures (about 20° - 26° C.) such as at least three to six months and longer, thereby obviating the need for cooling or refrigeration prior to use.

The excellent shelf-life and aging characteristics of the ion exchanged resole compositions employed in the practice of the present invention is attributable to their freedom from ionic species that respond to removal by the aforementioned ion exchange resins which are of two types. The first type is a cation exchange resin in its free acid form, that is, having exchangeable hydrogen cations ($H^+$) attached thereto. Such resins exhibit exchange potential with alkaline metal cations introduced to the phenol-aldehyde condensate as catalyst such as $Na^+$, $K^+$ and $Ba^{++}$. The hydrogen cations of the exchange resin are present as strongly acidic groups such as sulfonic acid groups ($—SO_3H$) or as weakly acidic groups ($—COOH$). Preferably, the cation exchange resin is of the strongly acidic variety. The particular polymeric structure to which the cation exchanging groups are attached is not critical to achieve the desired cation exchange reaction. Examples of suitable strong cation exchange resins are: styrene-divinylbenzene sulfonated resins, phenol-formaldehyde sulfonic acid resins, benzeneformaldehyde sulfonic acid resins, and the like. Such resins have been sold and marketed by several companies under various trade names. For instance, Rohm and Haas Company's series of sulfonated copolymers of styrene and divinylbenzene, available as Amberlite 200, 200C, IR-120, IR-122, IR-124 and XE-100, respectively, are suitable. Other suitable strong acid cation exchange resins are marketed by Dow Chemical Company as Dowex 50-W, and by Diamond Shamrock Company as Duolite C-3 and C-25. Illustrative of the weakly acidic cation exchange resins are crosslinked-acrylic polymers and copolymers of methacrylic acid and divinylbenzene available as Amberlite IRC-84 and IRC-50, respectively, of Rohm and Haas Company.

Some of the above-described cation exchange resins are marketed in the salt form. Therefore, prior to use in the preparation of the ion exchanged resoles employed in the practice of the present invention, such resins are treated to convert the ion exchange groups into the free acid form. This is readily effected with a mineral acid such as sulfuric acid or hydrochloric acid and the like. An excess of acid is generally used. Afterward, the excess acid is washed out with water or suitable solvent to remove the released salts. Spent resin is regenerated similarly.

The ion exchanged resoles employed in the practice of the present invention are also free of anions capable of being removed by an anion exchange resin in its free base form, that is, in a form having hydroxyl or free amino groups thereon. The anion exchange resin may be in either a strongly basic or weakly basic form. Those of the strongly basic variety are usually copolymers of styrene and divinylbenzene having quaternary ammonium substituents such as $[—N(CH_3)_3]^+Cl^-$ and $—[N(CH_3)_2(CH_2OH)]^+Cl^-$. Illustrative of suitable resins of this type are marketed by Rohm and Haas Company as Amberlite IRA-900, IRA-904, IRA-910, IRA-911 and IRA-400, respectively. Prior to use, such strongly basic anionic resins are treated with alkali such as aqueous alkali metal hydroxide solutions to replace the chloride anions with free hydroxyl and thereby form the trimethyl-ammonium hydroxide radical, $—N(CH_3)_3^+OH^-$. The resin is then washed thoroughly with water to remove the chloride salts. Also suitable are the weakly basic anion exchangers having polyamine functionality bonded to a matrix of styrene-divinylbenzene copolymer or crosslinked acrylic polymer. Such resins are available in their free base form from Rohm and Haas Company as Amberlite IRA-45, IRA-93 and IRA-68, respectively. When these various anion exchangers become spent they are readily regenerated by treatment with strong alkali (e.g., 2-5 weight percent aqueous potassium hydroxide) to replenish the hydroxyl groups or, in the case of the weakly basic variety, to free the amine functionality of salts.

In the preparation of the ion exchanged resoles, the ion exchange operation may be carried out batchwise or continuously. In either mode of operation, the alkaline phenol-aldehyde condensate may be deionized by treatment thereof with the two different types of ion exchange resins arranged as a mixed bed or as individual beds. In mixed bed operation, the alkaline condensate is intimately contacted with the exchange resin until the pH of the treated liquid substantially stabilizes at a value within the range of between about 4 and about 7, thereby indicating essentially complete deionization.

In carrying out the ion exchange reactions employing individual beds of resin, the alkaline condensate is intimately contacted with the cation exchange resin in its free acid form for a residence time sufficient to lower the pH of the condensate undergoing treatment to a value within the range from about 1.5 to about 4. Preferably the treatment is effected until the pH substantially stabilizes at a particular value within this range. Usually the pH stabilizes at a value between about 2 and about 3.5. Stabilization of the pH indicates essentially complete removal of cations. The cation exchanged liquid is then intimately contacted with the free base form of the anion exchange resin for a residence time sufficient to raise the pH to a value within the range from about 4 to about 7. Preferably the anion exchange treatment is effected until the pH remains substantially stable at a particular value within this range. Usually the pH stabilizes at a value between about 4.5 and about 6.5. Stabilization of pH indicates essentially complete removal of anions.

By "substantial stabilization" of pH at a particular value within the aforesaid respective ranges is meant a condition at which fluctuation in pH is no greater than about ±0.3.

In batch operation employing a mixture of the cation and anion exchange resins or sequential treatment of the alkaline condensate with these respective ion exchangers, intimate contact is readily effected by agitation of a slurry of the resins in the liquid condensate by any suitable means. When the pH is brought to within the aforesaid ranges, the liquid condensate and exchange resins are separated by conventional liquid-solids techniques such as decantation or filtration. In carrying out deionization sequentially, the liquid condensate is treated initially with the cation exchange resin and, inasmuch as the cation-exchanged material is acidic and has not yet been de-anionized, such separation and passage of liquid to the anion exchange treatment step should be effected as quickly as possible to minimize residence time in the acid solution and thereby avoid polymerization.

In continuous operation, the ion exchange resins are conveniently contained in the same or different columns. The flow of condensate through the column or columns is operable in any direction. The rate of flow through the resins is adjusted to obtain effluent from the respective cation and anion exchange resin beds, or mixed bed thereof, having a pH within the aforesaid respective ranges. Generally, the flow rate is between about 20 and about 50 pounds of condensate per minute per cubic foot of exchange resin. It is to be understood, however, that the flow rate required for any given deionization to obtain the aforesaid pH values may be lower or higher and is governed by a variety of factors such as the particle size of the ion exchange resin, the dimensions of the ion exchange bed, the viscosity of the liquid condensate to be treated, the concentration of alkaline metal catalyst employed in the condensation reaction and the capacity of the ion exchange resins. Flow rate or recycling requirements are readily determined by sampling effluent from the respective columns to measure the pH thereof. In the event the pH responds to addition of ion exchange resin (that is, the pH is not substantially stable), the effluent may be recycled through the resin bed or the flow rate adjusted accordingly to achieve essentially complete deionization.

The ion exchange reactions are effected at temperatures between about 20° C. and about 75° C. and usually at a temperature no higher than about 60° C. Maximum temperatures of between about 30° C. and about 50° C. are quite suitable. Pressures do not appear to have a critical effect on the ion exchange reactions. While atmospheric pressure appears to be most convenient, increased or reduced pressures can also be used, as desired. In column operation, somewhat greater pressure at the inlet may be necessary to overcome the pressure drop within any given column, depending upon the flow resistance and tightness of the resin bed.

The cations which are removed from the resole during the cation exchange reaction include metal cations corresponding to those of the alkaline metal catalyst employed in the condensation reaction. By treatment of the condensate until the pH substantially stabilizes within the aforementioned range from about 1.5 to about 4, and preferably from about 2 to about 3.5, the content of metal cations derived from the catalyst (e.g., $Na^+$, $K^+$ or $Ba^{++}$) is reduced to essentially zero, that is, to less than about 100 parts per million, based on the weight of condensate and as determined by emission spectroscopy and/or flame photometry. It is to be understood, however, that other metal cations the nature of which is unknown, may also be exchanged with $H^+$ of the cation exchanger (such as, for example, cationic impurities present in the phenol, formaldehyde or catalyst or derived from the reactor) and may also have an adverse effect on resole shelf-life if not otherwise removed.

The nature of the anions which are removed during the anion exchange reaction has not been elucidated. It is postulated, however, that such anions may be derivatives of formic acid or benzoic acid. It is to be understood, however, that other theories may equally explain the reason for the discovery that, unless the cation exchanged resole is treated with anion exchange resin to a pH within the aforesaid range from about 4 to about 7, and preferably to a pH from about 4.5 to about 6.5, maximum resole stability towards irreversible self-condensation during aging is not achieved.

The ion exchanged resoles employed in the practice of the present invention are derived from base-catalyzed phenol-aldehyde condensates produced under the aforementioned condensation conditions. A generally preferred overall combination of condensation conditions are temperatures between about 70° C. and about 90° C., a reaction time from about one to about 4.5 hours, and catalyst concentrations from about 0.2 to about 4 weight percent (basis, phenolic compound).

From the standpoint of providing ion exchanged resoles having a particularly unique and outstanding combination of improved inherent stability and enhanced inherent reactivity as foamable compositions, the preferred condensation catalysts are compounds of potassium, cesium and francium. Of these, potassium compounds constitute the preferred class of catalysts, in view of their greater availability. Any of the various grades of potassium hydroxide available commercially are suitably employed as the condensation catalyst. These various grades include potassium hydroxide produced by electrolysis of potassium chloride in standard diaphragm electrolytic cells and in mercury cells. Also suitable as the condensation catalyst is potassium hydroxide, derived from either a diaphragm cell or a mercury cell, which has been subjected to further purification to reduce the content of potassium chloride and/or other impurities such as trace metals. Potassium hydroxide is also available in various physical forms and any of these are suitably employed including pellet, flake, walnut-shaped briquettes and so forth. From the standpoint of providing ion exchanged resoles which reproducibly provide phenolic foam of substantially reduced friability, potassium hydroxide made available as mercury cell grade is preferably employed. Illustrative of potassium hydroxide made available as mercury cell grade is that supplied by Hooker Chemical Corporation and Diamond Shamrock Chemical Company.

As previously described herein, the alkaline condensate is aqueous. In the preparation of the ion exchanged resoles, water present in the reaction system may be left in the condensate and passed as such to the above-described ion exchange reactions. Separation of aqueous distillate from condensate can be effected in several stages such as by effecting partial stripping prior to treatment with the cation exchanger and further stripping after treatment with the anion exchanger, or stripping can be effected in one stage such as after the anion exchange reaction. However, when the ion exchange reactions are effected employing individual beds of the respective exchange resins, the condensate should contain a sufficient amount of diluent prior to passage to the cation exchange reaction so that the resulting cation exchanged material which is acidic, undergoes minimize polymerization prior to removal of anions. For this purpose, the condensate should contain at least about 10, and usually at least about 20, weight percent of diluent. The diluent can be water introduced to the system as above-described, an added normally liquid, organic compound in which the resole is soluble, or a combination of water and added organic diluent. Suitable organic diluents include one or more of the following: alcohols such as, for example, isopropanol; ketones such as acetone and methyl ethyl ketone; water soluble ethers such as 1,2-dimethoxyethane (Monoglyme) and bis(2-methoxyethyl)ether (Diglyme); esters such as methyl acetate; acetals such as dimethoxymethane and the dimethyl acetal of acetaldehyde; hemiacetals; and other such oxygen-containing polar liquids in which the resole is also soluble. Other suitable diluents include normally liquid, halogenated aliphatic compounds in which the resole is soluble. The latter class of diluents are exemplified by methylene chloride, chloroform, 1,2-dichloroethane, tetrachloroethylene, 1-bromo-2-chloroethane, hexachloro-1,3-butadiene, and chlorinated derivatives of the aforesaid oxygen-containing diluents such as hexachloroacetone. It is to be understood that methyl formate may also be introduced to the resole in this manner.

The ion exchanged resoles can be provided as aqueous or non aqueous compositions including non aqueous compositions which are either in concentrated form or dissolved in one of the aforesaid organic solvents. An especially suitable method for providing the ion exchanged resoles in anhydrous or substantially anhydrous form (0.5 weight percent water and less) comprises stripping alkaline condensate of aqueous distillate, adding isopropanol to the stripped condensate in an amount such that the combined weight of any remaining water and isopropanol is at least about 10 weight percent, subjecting the resulting mixture to the ion exchange reactions, and partially or completely stripping the deionized resole of isopropanol, as desired. During the latter operation, residual water is removed with isopropanol, thereby providing non aqueous products.

In the use of the ion exchanged resoles for the formation of phenolic foam as described herein, the water content thereof as well as the content of any added organic diluent, is reduced to a final level of not more than about 10, and preferably not more than about 6, weight percent. Usually, the concentration of water is reduced to between about 4 and about 0.5 or less weight percent. Minimizing water contents of foaming resoles is desirable in order to minimize shrinkage of the foam product. The initial viscosity of the ion exchanged resoles having such relatively low water contents, including the viscosity of non aqueous products, varies over a relatively wide range such as from about 400 up to about 150,000 centipoise (Brookfield at 25° C.), although usually initial viscosities are no higher than about 100,000 centipoise.

In addition to the above-described ion exchanged resoles and conventional resoles, the teachings of the present invention are also applicable to base-catalyzed phenol-aldehyde condensates which are treated with cation-exchange resins followed by the addition thereto of an alkaline metal compound. In accordance with this latter method, the respective condensation and cation exchange reactions are effected under the above-described conditions but, in lieu of treatment with an anion exchange resin, an alkaline compound is added to the acidic cation exchanged material to raise the pH thereof to a value between about 5 and about 6.7. Suitable for this latter purpose are the alkaline metal compounds employed to catalyze the condensation reaction. The resultant resoles are to be distinguished from the ion exchanged resoles described in my aforementioned application Ser. No. 595,744. Thus, the latter resoles are free of ionic species capable of being removed by the free acid form of a cation exchange resin and the free base form of an anion exchange resin and exhibit superior retention of reactivity as foamable compositions relative to resoles which are not free of such ionic species.

3. The Phenolic Foam Formulations

In addition to the phenolic resole and the aralkylpolyalkylsiloxane, other components of the phenolic foam formulations of the present invention include an acidic catalyst and a blowing agent.

The catalyst component of the foam formulation may be an inorganic acid or an organic acid and is usually a relatively strong acid added to the formulation as an aqueous solution. Illustrative of suitable acidic catalysts for foam polymer formulation are any of the following: hydrochloric acid; sulfuric acid; fluoboric acid; formic acid; mixtures of acidic catalysts based on boric acid or its anhydride with organic hydroxy acids having a hydroxyl group on a carbon atom no more than one carbon atom removed from the carboxyl group such as, in particular, oxalic acid, as described in U.S. Pat. No. 3,298,973; and other acid catalysts known to the art of phenolic foam formation. Other suitable acidic catalysts are organic sulfonic acids such as any of the following which can be used individually or in combination with one another: benzene sulfonic acid, toluene sulfonic acid, xylene sulfonic acid, phenol sulfonic acid, ethane sulfonic acid, butane sulfonic acid and the like, as well as resin sulfonic acids such as the phenol-sulfuric acid-formaldehyde reaction products described in Brit. Pat. No. 1,288,113. Illustrative of suitable mixtures of organic sulfonic acids for use as catalytic components of phenolic foam formulations of this invention, are modified toluene sulfonic acids such as that available as Ultra TX Acid and Sulframin TX Acid (Witco Chemical Company, Inc.).

Overall, the concentration of catalyst contained in the foaming reaction mixture may vary between about 0.5 and about 40 parts by weight per 100 parts by weight of the resole component, and usually no more than about 20 parts is used. The preferred concentration varies with the nature of the catalyst. For example, aqueous fluoboric acid (48 weight percent) and aqueous phenol sulfonic acid (65 weight percent) are usually used in an amount of no more than about 12 parts per 100 parts of resole.

As the source of blowing action, any blowing agent known to the art of phenolic foam formation may be employed in the practice of the present invention. For example, one class of suitable blowing agents are the polyhalogenated saturated fluorocarbons having a boiling point within the range from about minus 40° F. up to about 200° F. described in U.S. Pat. No. 3,389,094. Illustrative of this class are trichloromonofluoromethane, 1,1,2-trichloro-1,2,2-trifluoroethane ($CCl_2FCClF_2$), dichlorodifluoromethane, difluoroethane and 1,1,1,2-tetrachloro-2,2-difluoroethane. Other halogenated blowing agents are chlorohydrocarbons such as methylene chloride and 1,2-dichloroethane. Another class of suitable foaming agents are the aliphatic ethers having a boiling point between 30° C. and 100° C. such as diethyl ether, diisopropyl ether and other such compounds described in U.S. Pat. No. 2,845,396. The teachings of the latter patent and of said U.S. Pat. No. 3,389,094 in regard to other specific blowing agents are incorporated as part of the present disclosure by reference thereto.

Another blowing agent which may be employed in providing phenolic foam in accordance with the present invention is methyl formate in combination with 1,1,2-trichloro-1,2,2-trifluoroethane. Such combinations contain from about 5 to about 80 weight percent of methyl formate and are added to the formulation in an amount that at least about 0.4 and no more than about 20 parts by weight of methyl formate is added to the formulation per 100 parts by weight of resole. This particular blowing agent and its use in the formation of phenolic foam is described in my prior and copending application Ser. No. 617,243, filed Sept. 26, 1975 now U.S. Pat. No. 4,033,910.

Generally, the above-described blowing agents are used in an amount between about 2 and about 40 parts by weight per 100 parts by weight of resole contained in the foam formulation. Usually, between about 4 and about 20 parts is used.

The aralkyl-polyalkylsiloxane component may be introduced to the foam formulation as an individual stream or in combination with the resole as a mixture or blend. In either mode, the siloxane may be diluted in an amount up to about 50 weight percent with various normally liquid solvents. Suitable diluents for this purpose are a variety of oxygen-containing compounds such as dialkylphthalates (e.g., dioctylphthalate), mono-ols, diols, polyether polyols, and non ionic and anionic organic surfactants.

The concentration of the aralkyl-polyalkylsiloxane component contained in the blends and foam formulations of the present invention may vary over a relatively wide range. In general, the aralkyl-polyalkylsiloxane is present in an amount from about 0.1 to about 10 parts by weight per 100 parts by weight of resole. Usually, the siloxane is present in an amount of at least about 0.5 and no more than about 6 parts per 100 parts of resole. The particular amount of the aralkyl-polyalkylsiloxane component employed in any given foam formulation to provide a phenolic foam having improved punking resistance varies with such factors as the type of acid catalyst contained in the formulation, the concentration of the particular acid catalyst, the reactivity of the resole and foam density. For example, aqueous phenol sulfonic acid tends to provide phenolic foam having reduced susceptibility to punk relative to foams produced in the presence of aqueous fluoboric acid. Thus, in the use of aqueous phenol sulfonic acid as the acidic foaming catalyst, foams having improved punking resistance may be obtained at levels of the aralkylpolyalkylsiloxane component as low as 0.1 part per 100 parts by weight of resole, whereas in the use of aqueous fluoboric acid as the catalyst, it is usually desirable to employ at least one to two parts of the aralkyl-polyalkylsiloxane.

It is to be understood that, in addition to the resole and aralkyl-polyalkylsiloxane, the blends of the present invention may also contain other components. For example, the blends may additionally comprise any of the aforementioned blowing agents in the aforesaid amounts. Other suitable components of the resole/aralkyl-polykylsiloxane blends described herein, as well as of the phenolic foam formulations, are additives to reduce the viscosity of the resole component. Especially effective for this purpose is methyl formate as described in my aforementioned copending application Ser. No. 617,243, filed Sept. 26, 1975. Thus, the blends of the present invention may contain methyl formate as a viscosity lowering additive in an amount from about 0.4 to about 20 parts by weight per 100 parts by weight of the resole component, although usually no more than about 5 parts of methyl formate is used for this purpose.

In addition to functioning as an additive to improve the punking resistance of phenolic foam, the aralkyl-polyakylsiloxane oil also functions as a surface active agent or foam stabilizer. If desired, however, surface active agents known to the art of phenolic foam formation may also be employed as components of the phenolic resole/aralkylpolyalkylsiloxane blends and phenolic foam formulations described herein. For example, one class of suitable surface active components which may be employed as cell stabilizers are the non ionic organic surfactants such as condensation products of alkylene oxides (as illustrated by ethylene oxide, propylene oxide or combinations thereof) and akylphenols such as nonylphenol, dodecylphenol and the like. Other suitable organic surface active agents are known to the phenolic foaming art and include, for example, those disclosed in U.S. Pat. No. 3,389,094, the teachings of which in this regard are incorporated as part of the present disclosure by reference thereto. Also suitable as foam stabilizers are the polysiloxane-polyoxyalkylene copolymers described in the aforementioned U.S. Pat. No. 3,271,331 the teachings of which in this regard are also incorporated herein by reference thereto. When used, such organic and additional silicon-containing surface active agents are present in an amount from about 0.5 to about 10 parts by weight per 100 parts by weight of resole present in the resole-containing blend or foam formulation.

Illustrative of the aforementioned additional silicon-containing surface active components which may be present in the blends and phenolic foam formulations of the present invention, are the polymethylsiloxane-polyoxyethylene copolymers and polymethylsiloxane-poly(oxyethylene-oxypropylene) copolymers, including combinations thereof, having the following average composition,

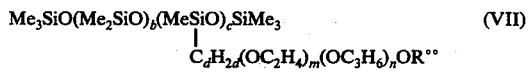

$$Me_3SiO(Me_2SiO)_b(MeSiO)_cSiMe_3 \quad\quad (VII)$$
$$\quad\quad\quad\quad\quad\quad\;| $$
$$\quad\quad\quad\quad\quad\quad C_dH_{2d}(OC_2H_4)_m(OC_3H_6)_nOR^{\circ\circ}$$

wherein: Me is methyl; $R^{\circ\circ}$ is hydrogen or alkyl having from one to four carbon atoms; $b$ has an average value from about 3 to about 100; $c$ has an average value from about 2 to about 10; $d$ has a value from 2 to 4; $m$ has an average value from about 4 to about 30; and $n$ is zero or a positive number having an average value up to about 25. In contrast to the effect of the aralkyl-polyalkylsiloxanes described herein, the polymethylsiloxane-polyoxyalkylene copolymer stabilizers encompassed by Formula VII generally do not, per se, improve the punking resistance of phenolic foam. Further, depending upon the other components of a given formulation such as the acid catalyst, such polymethylsiloxane-polyoxyalkylene copolymers may actually enhance the tendency of the foam to punk. Accordingly, when such copolymers are used in the practice of the present invention as additional foam stabilizers or to improve another property of the foam such as friability resistance, it is recommended that the aralkyl-polyalkylsiloxane component be used in higher concentrations than might otherwise be necessary to achieve maximum improvement in punking resistance. For example, when such polymethylsiloxane-polyoxyalylene copolymers are used in combination with the aralkyl-polyalkylsiloxane oils, it is usually desirable to employ the aralkyl-polyalkylsiloxane component in an amount of at least about 2 and up to about 10 parts by weight per 100 parts by weight of resole in order to overcome any adverse effect which the copolymers may have on the punking character of the phenolic foam product.

Other additives which may be present during the formation of phenolic foam in accordance with the teachings of this invention are fillers, pigments, dyes, organophosphorus compounds including those described in U.S. Pat. No. 3,673,130 such as, in particular, tetrakis(hydroxymethyl)phosphonium chloride, and like additives known to the phenolic foaming art.

The examples set forth hereinbelow are illustrative of the present invention and are not to be construed as unduly limiting.

Description of Resoles A Through F

In the foam data of the examples and comparative runs, the resoles employed are referred to as Resoles A through F, respectively. Of these, Resole A is illustrative of conventional phenol-formaldehyde foamable resoles whereas Resoles B through F are illustrative of the ion exchanged resoles described in my aforementioned copending application Ser. No. 595,744, filed July 14, 1975. Further details with respect to these starting materials are as follows.

Resole A: In the manufacture of Resole A, the phenol-formaldehyde condensation is effected using barium hydroxide catalyst and the alkaline condensate is neutralized with dilute sulfuric acid. The resultant solubilized barium salt is probably in a solvated form and, in any event, remains in the resole as a component thereof. As manufactured, Resole A had the following properties: a viscosity of about 2750 centipoise at 25° C.; a pH of 6.0; a foam density specification of 2.3 pcf.; and a solids content of 80 weight percent. Resole A is heat reactive under ordinary storage conditions and thus it is normally recommended that it be stored below about 7°. Prior to use in the foam preparations based thereon, Resole A had been stored under refrigeration (about 5° C.).

Resoles B through F: In the preparation of these materials, molten phenol and formaldehyde were condensed in the presence of aqueous potassium hydroxide catalyst. In regard to Resoles B to E, 171 pounds of phenol and 293 pounds of 37 weight percent aqueous formaldehyde solution were charged to the reactor. In the condensation reaction for Resole F, 700 pounds of phenol and 1110 pounds of 40 weight percent aqueous formaldehyde solution were used. The respective potassium hydroxide catalysts were: (1) "Potassium Hydroxide Pellets, 'Baker Analyzed' Reagent," sold by J. T. Baker and Company and used in the condensation reaction for Resoles B, C and D; (2) "Caustic Potash, Mercury Cell Grade (KOH, 90% minimum)," flake form, sold by Hooker Chemical Corporation and employed in the preparation of Resole E; and (3) "Flake Caustic Potash, Mercury Cell-Low Chloride," flake form, sold by Diamond Shamrock Chemical Company and used in the preparation of Resole F. The respective condensation reaction temperatures were controlled (about 83°–85° C.) by appropriate adjustment of reduced pressure for reaction times of 3 to 3¼ hours (Resoles B to E) and 2⅔ hours (Resole F). In the preparation of Resoles B to E, the respective aqueous alkaline condensates were ion exchanged by passage through a bed of the free acid (H+)form of Amberlite IR-120, followed by treatment of the cation exchanged condensate (pH, 2.1–2.4) with the anion exchange resin, Amberlite IRA-900 which had been converted to the OH− form prior to use. In the preparation of Resole F, the cation and anion exchange reactions were effected employing Amberlite 200C (macroreticular) and Amberlite IRA-400C (gel), respectively. (The said Amberlite ion exchange resins are marketed by Rohm and Haas Company.) The respective ion exchanged condensates were then stripped of aqueous distillate to provide Resoles B through F having water contents less than 4 weight percent.

General Foaming Procedure

In preparing the foams of the examples and comparative runs, substantially the same manipulative steps were followed. A typical procedure is as follows: The resole (300 parts by weight charge), the silicon-containing surfactant component or components, and the blowing agent are weighed successively into a cardboard container having a capacity of one quart. The mixture is blended by stirring with an air driven motor equipped with a stainless steel shaft containing three stainless steel paddles; the temperature of this mixture is within the range of 27° to 30° C. Blending is continued until a uniform creamy mixture is obtained which state is usually achieved in 30 to 60 seconds. A preweighed amount of catalyst solution is then poured on top of the premixture and the whole stirred vigorously for 15 seconds. The resultant blend is poured into a cardboard box (8 × 8 × 6 inches), the cream and rise times (in seconds) recorded, and the foam height (in inches) measured. The cream time is taken as the time from catalyst addition until the blend visibly begins to expand. Rise time is measured from the time of catalyst addition until expansion ceases. The height of rise is measured as of the indicated rise time. The foams are allowed to stand at ambient conditions for at least 24 hours before cutting. Determination of physical properties is usually made three days after the initial foam preparation.

Physical Property Measurements

Punking Test Procedure: The apparatus employed in this test consists of a foam sample holder and flame burner head. The sample holder is a ring clamp having a 3-inch diameter opening, and is positioned 3.0 ± 0.25 inches above the top edge of the burner head. The burner head is positioned vertically below the center of the 3-inch diameter opening of the sample holder. The flame burner equipment is a propane gas source connected to a pencil-flame burner head with matching fuel orifice, equivalent to Bernz-O-Matic propane Maxitorch kit Model JT25M with burner unit parts JT680. The test specimens of foam are five-inch cubes cut from the foam slab product. The specimen is placed atop the sample holder with the direction of rise parallel to the flame and is secured in such a manner that swelling or growth does not alter the specimen-to-flame source-distance relationship. The punking test is conducted in a hood at 75° ± 2° F. The baffles of the hood are adjusted so that smoke and other combustion products are removed without the draft causing the flame to deflect from the center of the test specimen. Before the test foam specimen is inserted, the burner is lit and adjusted to produce a steady test flame with a 1.5 ± 0.5 inch-long blue inner cone. The test flame temperature (measured by a thermocouple positioned 3.0 ± 0.25 inches above the burner head) is held at 2150 ± 25° F. for a period of not less than 3 minutes, without a foam specimen in place. The foam specimen is then positioned on the sample holder as quickly as possible and a timer is started. The duration of this initial phase of the test, referred to as "burn time," is 3 or 5 minutes as indicated in the tabulated data. It is noted that, in some instances where a 5 minute burn time was intended, a hole (approximately 3 inches in diameter) was burned completely through the foam sample after a burn time of 4 minutes and thus there was no point in continuing to apply the burner flame; these particular occurrences are also indicated in the data. After the indicated burn time, the weight loss suffered by the foam sample is usually determined and is the difference between the initial weight ($W_1$) and the weight ($W_2$) after burn. This represents the weight loss due to exposure of the foam sample to the intense heat and flame of the propane torch. The percent weight loss which occurs during the indicated burn time is equal to $W_1-W_2/W_1$ times 100. At the end of the indicated burn time and removal of the torch, the foam sample is usually weighed ($W_3$) after standing for 5 minutes. The percent weight loss 5 minutes after burn is equal to $W_1-W_3/W_1$ times 100. This percent weight loss reflects the relative tendencies of the foam samples to punk by providing a measurement of the weight loss as a function of time (i.e., rate of punking).

At a finite time after the flame is removed (that is, when a steady state condition is reached), the foam samples are rated by visual observation as either punking (denoted as "Yes") or non punking (denoted as "No"). A foam assigned a punking rating means that the afterglow or flameless combustion state continued until a major portion of the foam sample was consumed (e.g., approximately 80 to 100 percent). This continuous flameless combustion proceeds at different rates from sample to sample depending on the tendency of the foam to punk. A foam assigned a non punking rating means that the test sample had lost no more than about 10 percent of its weight from the time the flame had been removed until a steady state was reached.

Compressive Strength of the foam products is reported in pounds per square inch (psi.) and was determined in accordance with ASTM D-1621.

Core Density of the foam products is reported in pounds per cubic foot (pcf.) and was determined in accordance with ASTM D-1632.

Friability Resistance was measured using a combination of ASTM C-367 and C-421 tumbling tests, that is, the test specimens are conditioned at room temperature with one inch wooden cubes in accordance with ASTM C-367, and the test time intervals (after two and eight minute periods for a total of ten minutes) were in compliance with ASTM C-421.

IDENTIFICATION OF SILICONE SURFACTANT COMPONENTS

For the sake of brevity, the aralkyl-polyalkylsiloxane oils employed in the examples which follow are referred to as Phenylethyl Siloxane A and Phenylethyl Siloxane B and are more particularly defind as follows:

Phenylethyl Siloxane A has the average composition,

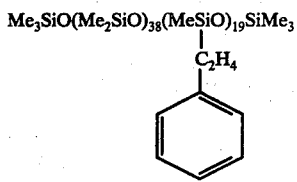

wherein Me is methyl.

Phenylethyl Siloxane B has the average composition,

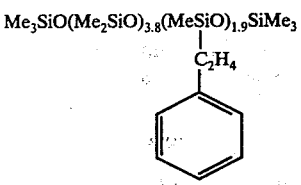

wherein Me is methyl.

For convenience, other silicon-containing components employed in the foam preparations of the comparative runs or in combination with the phenylethyl-polymethylsiloxane component employed in the examples, are referred to as Siloxane-Polyether Copolymers I, II, III and IV, respectively, and are identified as follows:

Siloxane-Polyether Copolymer I is a polymethylsiloxane-poly(oxyethylene-oxypropylene) copolymer having the average composition,

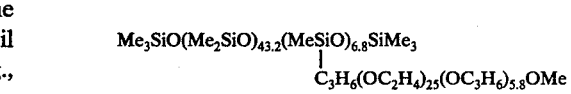

wherein Me is methyl.

Siloxane-Polyether Copolymer II is a polymethylsiloxane-polyoxyethylene copolymer having the average composition, $$Me_3SiO(Me_2SiO)_{13}(MeSiO)_{5.5}SiMe_3$$
$$|$$
$$C_3H_6(OC_2H_4)_{17.5}OMe$$

wherein Me is methyl.

Siloxane-Polyether Copolymer III is a polymethylsiloxane-polyoxyethylene copolymer having the average composition,

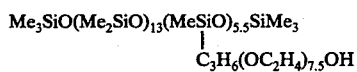

wherein Me is methyl.

Siloxane-Polyether Copolymer IV is a phenylethyl-modified polymethylsiloxane-poly(oxyethyleneoxypropylene) copolymer having the average composition,

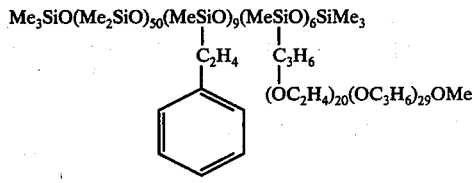

wherein Me is methyl.

EXAMPLE 1

In this example, a phenolic foam of the invention was prepared employing Phenylethyl Siloxane A as the surfactant component of the reaction mixture. Other foams not of the invention were also prepared (Run Nos. C-1 to C-4) employing above-described Siloxane-Polyether Copolymers I to IV as the respective surfactant components. Except for this variation in the nature of the surfactant, the reaction mixtures contained the same resole (above-described ion exchanged Resole B), acid catalyst and blowing agent, and had the composition given in the following Table I.

TABLE I
FOAM FORMULATION A

| Component | Parts By Weight |
|---|---|
| Resole B | 300 |
| Catalyst: | |
|   Fluoboric acid as a 48 weight percent aqueous solution | 16.5 |
| Blowing Agent: | |
|   1,1,2-Trichloro-1,2,2-Trifluoroethane | 39 |
| Surfactant /1/ | 9 |

/1/ The particular surfactant employed is given in Table II.

Each foam was subjected to the above-described test to determine punking resistance. The results including foam reactivity data are given in Table II which follows.

TABLE II

| Example No. | — | — | — | — | 1 |
|---|---|---|---|---|---|
| Run No. C- | 1 | 2 | 3 | 4 | — |
| Foam No. | 1 | 2 | 3 | 4 | 5 |
| Foam Formulation A /1/ | | | | | |
| Surfactant Component: | | | | | |
|   Siloxane-Polyether Copolymer | I | II | III | IV | — |
|   Phenylethyl Siloxane | — | — | — | — | A |
| Cream time, seconds | 30 | 15 | 35 | 35 | 35 |
| Rise time, seconds | 130 | 90 | 125 | 115 | 120 |
| Tack-free time, seconds | 90 | 110 | 100 | 80 | 65 |
| Rise height, inches | 8 | 9 | 8 | 6 | 8.5 |
| Shrinkage | None | ¼" | ¼" | None | None |
| Foam Properties | | | | | |
| Density, pcf. | 1.33 | 1.31 | 1.54 | 2.24 | 1.36 |
| Punking: | | | | | |
|   Weight loss after 3 minute burn, % | 18.3 | 24.1 | 12.8 | 1.9 | 5.9 |
|   Weight loss 5 minutes after burn, % | 41.2 | 100 | 38.7 | 7.5 | 0 |
|   Rating /2/ | Yes | Yes | Yes | Yes | No |

/1/ The other components and relative proportions of components are as given in Table I.
/2/ As previously defined herein, "Yes" denotes a punking foam and "No" denotes a non punking foam.

Inspection of the data of Table II shows that of this series, the only foam which qualified for a rating as a non punking foam was Foam No. 5 in which the surfactant or foam stabilizer was the phenylethyl-polymethylsiloxane component. On the other hand, although Siloxane-Polyether Copolymers I to IV were effective foam stabilizers, the foams produced therewith, at least in the given aqueous fluoboric acid catalyzed formulation, did not qualify for a non punking rating. It is further noted that, as between Siloxane-Polyether Copolymers I to IV, the rate of punking observed during each test varied and was fast for the foams produced with I, II and III and substantially slower for Foam No. 4 produced with phenylethyl-modified Siloxane-Polyether Copolymer IV. On the other hand, the use of Phenylethyl Siloxane A in the same aqueous fluoboric acid catalyzed formulation appeared to inhibit the flameless combustion phenomenon completely.

EXAMPLES 2 to 4

In this series of foam preparations which are within the scope of the present invention, the respective reaction mixtures were varied with respect to the concentration of the surfactant component. The resole was above-described ion exchanged Resole C and the foam stabilizer or surfactant component was Phenylethyl Siloxane A. The other components and relative proportions of ingredients contained in the formulation are given in the following Table III.

TABLE III
FOAM FORMULATION B

| Component | Parts By Weight |
|---|---|
| Resole C | 300 |
| Catalyst: | |
|   Fluoboric acid as a 48 weight percent aqueous solution | 21 |
| Blowing Agent: | |
|   1,1,2-Trichloro-1,2,2-trifluoroethane | 30 |
|   Methyl formate | 9 |
| Phenylethyl Siloxane A | Varied /1/ |

/1/ The particular amount employed is given in Table IV.

The foam reactivity data, results of the punking test as well as other foam properties are given in Table IV which follows.

TABLE IV

| Example No. | 2 | 3 | 4 |
|---|---|---|---|
| Foam No. | 6 | 7 | 8 |
| Foam Formulation B /1/ | | | |
|   Phenylethyl Siloxane A, pts, by wt. | 3 | 6 | 9 |
| Cream time, seconds | 20 | 20 | 20 |
| Rise time, seconds | 90 | 95 | 65 |
| Tack-free time, seconds | 65 | 75 | 55 |
| Rise height, inches | 7 | 7 | 6.5 |
| Shrinkage | None | None | None |
| Foam Properties | | | |
|   Core density, pcf. | 1.83 | 1.56 | 2.37 |
|   Compressive strength, psi. (25° C.) | | | |
|     Parallel | 10 | 10 | 19 |
|     Perpendicular | 8 | 6 | 14 |
|   Friability, % weight loss | | | |
|     After 2 minutes | 27 | 14 | 13 |
|     After 10 minutes | 75 | 81 | 61 |
|   Oxygen Index /2/ | 42.16 | 41.90 | 41.62 |
|   Punking: | | | |
|     Weight loss after 3 minute burn, % | 3.3 | 4.6 | 5.7 |
|     Weight loss 5 minutes after burn, % | 4.0 | 4.9 | 5.8 |
|     Rating /3/ | No | No | No |

/1/ As defined in Table III.
/2/ ASTM D-2863-70.
/3/ As previously defined herein "No"denotes that the foam qualified for a non punking rating.

As shown by the results of Table IV, the phenylethyl-polymethylsiloxane surfactant functioned as an effective phenolic foam stabilizer and non punking additive when used at different concentration levels from 1 to 3 parts per 100 parts of the ion exchanged resole.

EXAMPLES 5 to 11

The purpose of this series of foam preparations was to study the effect on the punking character of foams produced in the presence of a combination of the aralkyl-polyalkylsiloxane and a polyalkylsiloxane-polyoxyalkylene copolymer, relative to the use of either type of surfactant individually. For this purpose, Phenylethyl Siloxane A and Siloxane-Polyether Copolymer I were employed as the respective types of surfactants. For the purpose of comparison, control foams were also prepared (Run Nos. C-5 and C-6) in which the sole surfactant was Siloxane-Polyether Copolymer I. In each preparation, ion exchanged Resole D was used. The other components and relative proportions thereof are given in the following Table V.

TABLE V

FOAM FORMULATION C

| Component | Parts By Weight |
|---|---|
| Resole D | 300 |
| Catalyst: | |
| Fluoboric acid as a 48 weight percent aqueous solution | 18 |
| Blowing Agent: | |
| 1,1,2-Trichloro-1,2,2-trifluoroethane | 39 |
| Surfactant: | |
| Phenylethyl Siloxane A | Varied /1/ |
| Siloxane-Polyether Copolymer I | Varied /1/ |

/1/ The specific proportions are given in Table VI.

Each foam preparation was subjected to the above-described test to determine the relative punking tendencies of the respective foams. The results as well as other foam properties and reactivity data are given in Table VI which follows.

trol Foam 9 (Run C-5) was significantly higher (26.5 percent). Similarly, the respective values for this weight loss measurement for Foams 15 to 17 of Examples 9 to 11 were 24.4, 22.6 and 19.9 percent whereas for control Foam 14 of Run C-6, the value was 39.7 percent. Although this improvement was not observed in regard to Foam 10 of Example 5 in which the two types of surfactants were also employed in combination, it is evident that increasing the concentration of the phenylethyl-polymethylsiloxane from one to two parts per 100 parts of resole (Examples 5 and 6, respectively), caused a substantial increase in punking resistance. Of further interest in regard to the data of Table VI is that the use of Siloxane-Polyether Copolymer I at the relatively high concentrations of 3 to 4 parts per 100 parts of resole, as in control Run Nos. C-5 and C-6, provided phenolic foams (Nos. 9 and 14) of improved friability resistance relative to Foam No. 13 of Example 8 which was stabilized with Phenylethyl Siloxane A only. Thus, for control Foams 9 and 14 the normalized 10 minute weight loss values were 18 and 12 percent respectively, whereas the corresponding value for Foam No. 13 of Example 8 was 50 percent. Further, the friability resistance of Foams 10 to 12 of Examples 5 to 7 (in which the two types of surfactants were employed in combination) was substantially better than the friability resistance of Foam No. 13 of Example 8. It is evident, there-

TABLE VI

| Example No. | — | 5 | 6 | 7 | 8 | — | 9 | 10 | 11 |
|---|---|---|---|---|---|---|---|---|---|
| Run No. | C-5 | — | — | — | — | C-6 | — | — | — |
| Foam No. | 9 | 10 | 11 | 12 | 13 | 14 | 15 | 16 | 17 |
| Foam Formulation C /1/ | | | | | | | | | |
| Phenylethyl Siloxane A /2/ | 0 | 3 | 6 | 9 | 9 | 0 | 3 | 6 | 9 |
| Siloxane-Polyether Copolymer I /2/ | 9 | 9 | 9 | 9 | 0 | 12 | 12 | 12 | 12 |
| Cream time, seconds | 35 | 35 | 40 | 45 | 35 | 45 | 40 | 40 | 45 |
| Rise time, seconds | 130 | 135 | 120 | 115 | 130 | 160 | 185 | 130 | 135 |
| Tack-free time, seconds | 85 | 85 | 80 | 80 | 70 | 95 | 100 | 95 | 80 |
| Foam Properties | | | | | | | | | |
| Core density, pcf. | 1.60 | 2.06 | 2.08 | 2.19 | 1.57 | 1.36 | 1.70 | 1.75 | 1.70 |
| Compressive strength, psi. (25° C.) | | | | | | | | | |
| Parallel | 22.6 | 31.0 | 27.2 | 31.3 | 9.5 | 16.6 | 25.0 | 26.1 | 22.6 |
| Perpendicular | 12.4 | 17.0 | 20.3 | 20.1 | 6.7 | 7.9 | 13.1 | 15.1 | 11.9 |
| Friability, % weight loss | | | | | | | | | |
| After 2 minutes | 3 | 6 | 6 | 6 | 10 | 5 | 5 | 4 | 4 |
| After 10 minutes | 33 | 36 | 35 | 36 | 63 | 17 | 34 | 29 | 28 |
| 10 minute weight loss, normalized to 2.00 pcf. | 18 | 37 | 36 | 39 | 50 | 12 | 29 | 25 | 24 |
| Punking: | | | | | | | | | |
| Punking: | | | | | | | | | |
| Density, pcf. /3/ | 1.59 | 2.07 | 2.10 | 2.18 | 1.61 | 1.36 | 1.71 | 1.76 | 1.68 |
| Weight loss after 3 minute burn time, % | 12.5 | 15.1 | 7.3 | 4.6 | 4.1 | 5.3 | 10.0 | 10.1 | 9.5 |
| Weight loss 5 minutes after burn time, % | 26.5 | 33.6 | 16.6 | 12.0 | 4.3 | 39.7 | 24.4 | 22.6 | 19.9 |
| Rating /4/ | Yes | Yes | Yes | Yes | No | Yes | Yes | Yes | Yes |

/1/ Other components are as defined in Table V.
/2/ Parts by weight per 300 parts by weight charge of resole.
/3/ For five-inch cube used in punking test.
/4/ As previously defined, "Yes" denotes punking foam and "No" denotes non punking foam.

Inspection of the results of Table VI shows that, in contrast to the punking rating of control Foam No. 9 of Run C-5 (in which the sole silicone surfactant was Siloxane-Polyether Copolymer I), Foam No. 13 of Example 8 (in which the sole silicone surfactant was Phenylethyl Siloxane A) qualified for rating as a non punking foam. The results also show that the employment of the phenylethyl-polymethylsiloxane in combination with the polymethylsiloxane-poly(oxyethylene-oxypropylene) copolymer as in Examples 6, 7 and 9 to 11, provided foams which punked at a decreased rate relative to the respective control foams of Runs C-5 and C-6. For example, the respective percent weight loss values determined five minutes after the three minute burn time were 16.6 and 12.0 for Foams 11 and 12 of Examples 6 and 7 whereas the corresponding value for confore, that the use of the phenylethyl-polymethylsiloxane in combination with a polyalkylsiloxane-polyoxyalkylene copolymer such as Siloxane-Polyether Copolymer I at respective appropriate concentrations of each surfactant, allows for the formation of phenolic foam having improved friability resistance as well as improved punking resistance, albeit at some sacrifice of the improved resistance to punking which is otherwise imparted to phenolic foam when the aralkyl-polyalkylsiloxane is used as essentially the sole silicone surfactant of the formulation.

EXAMPLES 12 to 17

In this series of foam preparations, as well as in the preparation of the control foams (Runs C-7 and C-8), above-described ion exchanged Resole E was employed as the resole component of respective reaction mixtures catalyzed with aqueous phenol sulfonic acid (Foam Formulation D) and aqueous fluoboric acid (Foam Formulation E). As prepared, Resole E had a water content of 3.10 weight percent and a Brookfield viscosity of 15,000 centipoise at 25° C. It is noted that, relative in particular to the reactivity of conventional phenol-formaldehyde resoles, ion exchanged Resole E was a highly reactive resin as reflected by its rapid polymerization under acidic conditions. In the foam preparations of these examples, Phenylethyl Siloxane A was employed as the surfactant component at 1, 2 and 3 parts per 100 parts of Resole E. The control foams of Runs C-7 and C-8 were stabilized with Siloxane-Polyether Copolymer I at a concentration of 1 part per 100 parts of resole. The composition of Foam Formulations D and E are given in the following Table VII.

TABLE VII

FOAM FORMULATIONS D AND E

| Component | Parts By Weight D | E |
|---|---|---|
| Resole E | 300 | 300 |
| Catalyst: | | |
| Fluoboric acid as a 48 weight percent aqueous solution | 0 | 9 |
| Phenolsulfonic acid as a 65 weight percent aqueous solution | 15 | 0 |
| Blowing Agent: | | |
| 1,1,2-Trichloro-1,2,2-trifluoro-ethane | 15 | 15 |
| Surfactant: | | |
| Phenylethyl Siloxane A | Varied[1] | Varied[1] |
| Siloxane-Polyether Copolymer I | Varied[1] | Varied[1] |

[1]The specific proportions are given in Table VIII.

Each foam was subjected to the above-described punking test using a three minute burn time. The results as well as other foam physical properties and reactivity data are given in Table VIII which follows.

TABLE VIII

| Example No. | — | 12 | 13 | 14 | — | 15 | 16 | 17 |
|---|---|---|---|---|---|---|---|---|
| Run No. | C-7 | — | — | — | C-8 | — | — | — |
| Foam Formulation | D /1/ | D /1/ | D /1/ | D /1/ | E /2/ | E /2/ | E /2/ | E /2/ |
| Phenylethyl Siloxane A /3/ | 0 | 3 | 6 | 9 | 0 | 3 | 6 | 9 |
| Siloxane-Polyether Copolymer I /3/ | 3 | 0 | 0 | 0 | 3 | 0 | 0 | 0 |
| Cream time, seconds | 29 | 25 | 35 | 45 | 35 | 30 | 45 | 45 |
| Rise time, seconds | 90 | 95 | 90 | 100 | 105 | 80 | 100 | 95 |
| Tack-free time, seconds | 70 | 80 | 60 | 60 | 95 | 90 | 110 | 100 |
| Rise height, inches | 6.5 | 7 | 6 | 6.5 | 5 | 5 | 5 | 5 |
| Shrinkage | trace | trace | ⅛" | ⅛" | ⅛" | ⅛" | ⅛" | ⅛" |
| Foam Properties | | | | | | | | |
| Core density, pcf. | 2.37 | 2.31 | 2.54 | 2.36 | 2.48 | 2.66 | 2.73 | 2.81 |
| Compressive strength, psi. (25° C.) | | | | | | | | |
| Parallel | 27.8 | 19.8 | 18.9 | 18.8 | 37.5 | 27.0 | 28.2 | 28.8 |
| Perpendicular | 20.3 | 16.7 | 18.8 | 17.1 | 24.1 | 24.9 | 24.0 | 25.8 |
| Friability, % weight loss | | | | | | | | |
| After 2 minutes | 6 | 8 | 2 | 1 | 2 | 8 | 8 | 7 |
| After 10 minutes | 34 | 47 | 36 | 33 | 26 | 53 | 52 | 48 |
| After 20 minutes | 60 | 79 | 68 | 66 | 52 | 86 | 84 | 77 |
| Punking Rating /4/ | Yes | No | No | No | Yes | Yes | No | No |

/1/ As defined in Table VII, catalyzed with aqueous phenol sulfonic acid (15 parts by weight).
/2/ As defined in Table VII, catalyzed with aqueous fluoboric acid (9 parts by weight).
/3/ Parts by weight per 300 parts by weight of resole charge.
/4/ Burn time was 3 minutes; "Yes" denotes a punking foam and "No" denotes a non punkingfoam as previously defined herein.

The results given in Table VIII for Examples 12 to 14 and control Run C-7 in which the acid catalyst was aqueous phenol sulfonic acid, show that the presence of the phenylethyl-polymethylsiloxane in the foam formulation in amounts from 1 to 3 parts per 100 parts of resole, provided foams which qualified for a non punking rating in contrast to the punking rating assigned to the control foam. In regard to the results of Examples 15 to 17 and control Run C-8 (which were catalyzed with aqueous fluoboric acid), a non punking foam was provided in Examples 16 and 17 in which the phenylethyl-polymethylsiloxane was used in an amount of 2 to 3 parts per 100 parts of resole, whereas in the given formulation, the use of the phenylethyl-polymethylsiloxane at the lower concentration of one part per 100 parts of resole, did not provide a foam which qualified for the non punking rating. These and other results included herein indicate that the particular amount of the aralkyl-polyalkylsiloxane employed in any given formulation to render phenolic foam non punking, varies with the type of acid catalyst, the concentration of catalyst, the reactivity of the resole and other such factors. The data also indicate that, in general, foams catalyzed with aqueous fluoboric acid tend to be more difficult to render non punking than foams catalyzed with aqueous phenol sulfonic acid. In any event, the illustrative data amply demonstrate the ability of the aralkyl-polyalkylsiloxanes described herein to function as non punking additives to phenolic foam, and that the amount required in any given formulation to impart increased punking resistance is readily determined.

EXAMPLES 18 to 26

In these examples as well as associated control Runs C-9 to C-12, phenolic foams were prepared employing conventional Resole A as the resole component of respective reaction mixtures catalyzed with aqueous phenol sulfonic acid (Foam Formulation F) and aqueous fluoboric acid (Foam Formulation G). As used in these foam preparations, Resole A had a water content of 9.1 weight percent and a Brookfield viscosity of 3200 centipoise (at 25° C.). The composition of the respective reaction mixtures is given in the following Table IX.

TABLE IX

FOAM FORMUATIONS F AND G

| Component | Parts by Weight F | G |
|---|---|---|
| Resole A | 300 | 300 |
| Catalyst: | | |
| Fluoboric acid as a 48 weight percent aqueous solution | 0 | 21 |
| Phenolsulfonic acid as a 65 weight percent aqueous solution | 28 | 0 |
| Blowing Agent: | | |
| 1,1,2-Trichloro-1,2,2-trifluoro-ethane | 36 | 36 |
| Surfactant: | | |
| Phenylethyl Siloxane A | Varied[1] | Varied[2] |

TABLE IX-continued
FOAM FORMULATIONS F AND G
Parts by Weight and Runs C-9 and C-10, based on Formulation F) and in Table XI (Examples 23 to 26 and Runs C-11 and C-12, based on Formulation G). Tables X and XI follow.

TABLE X

| Example No. | — | — | 18 | 19 | 20 | 21 | 22 |
|---|---|---|---|---|---|---|---|
| Run No. | C-9 | C-10 | — | — | — | — | — |
| Foam No. | 26 | 27 | 28 | 29 | 30 | 31 | 32 |
| Foam Formulation F /1/ | | | | | | | |
| Surfactant: | | | | | | | |
| Phenylethyl Siloxane A /2/ | 0 | 0 | 3 | 6 | 7.5 | 9 | 12 |
| Siloxane-Polyether Copolymer I /2/ | 0 | 3 | 0 | 0 | 0 | 0 | 0 |
| Cream time, seconds | 115 | 120 | 120 | 135 | 155 | 150 | 155 |
| Rise time, seconds | 290 | 280 | 305 | 320 | 320 | 330 | 330 |
| Tack-free time, seconds | 155 | 135 | 150 | 185 | 180 | 180 | 180 |
| Gel time, seconds | 220 | 185 | 210 | 240 | 200 | 220 | 210 |
| Rise height, inches | 6 | 6 | 6.5 | 6 | 6 | 6 | 6 |
| Foam Properties | | | | | | | |
| Core density, pcf. | 1.62 | 2.00 | 1.71 | 1.68 | 1.65 | 1.56 | 1.79 |
| Compressive strength, psi. (25° C) | | | | | | | |
| Parallel | 8.7 | 21.7 | 10.4 | 9.7 | 9.1 | 7.7 | 10.0 |
| Perpendicular | 7.3 | 13.1 | 8.7 | 9.2 | 8.3 | 8.7 | 10.1 |
| Friability, % weight loss | | | | | | | |
| After 2 minutes | 28.6 | 6.45 | 20.3 | 17.2 | 20.6 | 18.0 | 18.3 |
| After 10 minutes | — | 44.3 | — | 80.7 | 99.8 | 88.0 | 98.8 |
| Punking: | | | | | | | |
| Weight loss after 5 minute burn time, % /3/ | 17.8 | 13.9 | 33.7 | 31.3 | 27.9 | 27.5 | 25.7 |
| Weight loss 5 minutes after burn time, % | 24.2 | 16.9 | 43.6 | 31.5 | 28.6 | 28.2 | 26.1 |
| Rating | Yes /4/ | No /4/ | No | No | No | No | No |

/1/ Other components are as defined in Table IX.
/2/ Parts by weight per 300 parts by weight of resole.
/3/ Except in Run Nos. C-9 and C-10, burn time was curtailed after 4 minutes.
/4/ Four minute curtailed burn time.

TABLE XI

| Example No. | — | — | 23 | 24 | 25 | 26 |
|---|---|---|---|---|---|---|
| Run No. | C-11 | C-12 | — | — | — | — |
| Foam No. | 33 | 34 | 35 | 36 | 37 | 38 |
| Foam Formulation G /1/ | | | | | | |
| Surfactant: | | | | | | |
| Phenylethyl Siloxane A /2/ | 0 | 0 | 3 | 6 | 9 | 12 |
| Siloxane-Polyether Copolymer I /2/ | 0 | 3 | 0 | 0 | 0 | 0 |
| Cream time, seconds | 90 | 80 | 80 | 90 | 95 | 95 |
| Rise time, seconds | 280 | 220 | 240 | 255 | 260 | 255 |
| Tack-free time, seconds | 140 | 130 | 120 | 140 | 150 | 130 |
| Gel time, seconds | 200 | 145 | 165 | 170 | 160 | 155 |
| Rise height, seconds | 5 | 5.5 | 5.5 | 5.5 | 5.5 | 5 |
| Shrinkage | 1/4" | trace | 1/8" | 1/16" | trace | trace |
| Foam Properties | | | | | | |
| Core density, pcf. | 2.06 | 2.36 | 1.98 | 2.14 | 2.11 | 2.18 |
| Compressive strength, psi. (25° C.) | | | | | | |
| Parallel | | | | | | |
| Perpendicular | 12.1 | 18.9 | 11.3 | 8.3 | 13.2 | 14.6 |
| Friability, % weight loss | | | | | | |
| After 2 minutes | 20.42 | 6.92 | 15.1 | 16.1 | 15.1 | 2.70 |
| After 10 minutes | 88.8 | 42.6 | 84.7 | 79.9 | 81.6 | 96.2 |
| After 20 minutes | — | 77.2 | — | — | — | 96.2 |
| Punking: | | | | | | |
| Weight loss after 5 minute burn time, % | 15.5 | 13.7 | 20.4 | 21.6 | 16.1 | 17.2 |
| Weight loss 5 minutes after burn time, % | 28.0 | 35.1 | 25.3 | 22.7 | 16.8 | 17.9 |
| Rating /3/ | Yes | Yes | No | No | No | No |

/1/ Other components are as defined Table IX.
/2/ Parts by weight per 300 parts by weight of resole.
/3/ As previously defined herein, "Yes" denotes a punking foam and "No" denotes a non punking foam.

| Component | F | G |
|---|---|---|
| Siloxane-Polyether Copolymer I | Varied[1] | Varied[2] |

[1] The specific proportions are given in Table X.
[2] The specific proportions are given in Table XI.

In the control runs, foams were prepared either in the absence of any added silicone surfactant (Runs C-9 and C-11) or in the presence of Siloxane-Polyether Copolymer I as the sole silicone surfactant (Runs C-10 and C-12). In preparing the foams of the examples, the silicone surfactant was Phenylethyl-Siloxane A. The foams of the invention as well as the control foams were subjected to the abovedescribed punking test applying, except as noted, a burn time of five minutes. The results of the punking tests as well as other foam properties and reactivity data are given in Table X (Examples 18 to 22 and Runs C-9 and C-10, based on Formulation F) and in Table XI (Examples 23 to 26 and Runs C-11 and C-12, based on Formulation G).

The results of Tables X and XI demonstrate that the aralkyl-polyalkylsiloxanes described herein such as illustrative Phenylethyl Siloxane A, also allow for the formation of non punking phenolic foam based on conventional resoles such as Resole A. Thus, each of phenol sulfonic acid catalyzed Foams 28 to 32 (Table X), as well as each of fluoboric acid catalyzed Foams 35 to 38 (Table XI) qualified for rating as a non punking foam. In contrast, a punking rating was assigned to control Foams 33 and 34 (Table XI) which were catalyzed with fluoboric acid and contained either no silicone surfactant (Foam 33) or the indicated polymethylsiloxane-poly(oxyethylene-oxypropylene) copolymer (Foam 34). Likewise, a punking rating was also assigned to control Foam 26 (Run C-9 of Table X) which had been catalyzed with aqueous phenol sulfonic acid and formed in the absence of any added foam stabilizing component. On the other hand, control Foam 27 (Run C-10 of Table X) was assigned a non punking rating, this particular foam having been catalyzed with aqueous phenol sulfonic acid (28 parts per 300 parts of resole) and formed in the presence of Siloxane-Polyether Copolymer I (3 parts per 300 parts of resole). In contrast to the non punking rating assigned to control Foam 27 of Run C-10, reference to Table VIII shows that control Foam 18 of Run C-7 was rated as a punking foam. Of interest is that Foam 18 had also been produced with Siloxane-Polyether Copolymer I (3 parts per 300 parts of resole) and catalyzed with aqueous phenol sulfonic acid but at a lower concentration of acid (15 parts per 300 parts of resole). One explanation for the results of Run C-10 may reside in the fact that a hole had burned completely through the foam sample before the end of the intended burn time of five minutes and thus the burn time was curtailed after four minutes. Consequently, it is possible that a substantial amount of heat may have been lost and that the foam may not have been subjected to the full force of the intended test. As noted, a similar burn-through was also observed in testing control Foam 26 of Run C-9 but that particular foam apparently had a strong enough tendency to punk even without being subjected to the full effect of the test. Another explanation for the results of Run C-10 may reside in the relatively high concentration of the aqueous phenol sulfonic acid catalyst (28 parts per 300 parts of resole). In the latter event, the phenol sulfonic acid may have also contributed to the non punking character of Foams 28 to 32 of the invention.

EXAMPLES 27 to 29

In accordance with this series of foam preparations and control Run C-13, above-described conventional Resole A was employed as the resole component of the foam forming reaction mixture. As used in this series of foam preparations, Resole A had a water content of 8.50 weight percent. The foams of the examples were produced in the presence of Phenylethyl Siloxane B in an amount of 1, 2 and 3 parts per 100 parts of resole, respectively. In the control run, Siloxane-Polyether Copolymer I was employed at 1 part per 100 parts of resole. The other components and relative proportions of ingredients are given in the following Table XII.

TABLE XII

FOAM FORMULATION H

| Component | Parts By Weight |
|---|---|
| Resole A | 300 |
| Catalyst: | |
|   Fluoboric acid as a 48 weight percent aqueous solution | 33 |
| Blowing Agent: | |
|   1,1,2-Trichloro-1,2,2-trifluoroethane | 60 |
| Surfactant: | |
|   Phenylethyl Siloxane B | Varied /1/ |
|   Siloxane-Polyether Copolymer I | Varied /1/ |

/1/ The particular amounts employed are given in Table XIII.

Samples of each foam were subjected to the above-described punking test employing a five minute exposure to the flame of the propane torch. The results of this evaluation and the foam reactivity data are given in Table XIII which follows.

TABLE XIII

| Example No. | — | 27 | 28 | 29 |
|---|---|---|---|---|
| Run No. | C—13 | — | — | — |
| Foam No. | 39 | 40 | 41 | 42 |
| Foam Formulation H /1/ | | | | |
| Surfactant: | | | | |
|   Phenylethy Siloxane B /2/ | 0 | 3 | 6 | 9 |
|   Siloxane-Polyether Copolymer I /2/ | 3 | 0 | 0 | 0 |
| Cream time, seconds | 60 | 45 | 60 | 75 |
| Rise time, seconds | 80 | 160 | 190 | 200 |
| Gel time, seconds | 100 | 100 | 95 | 100 |
| Rise height, inches | 6 | 6 | 6 | 6 1/2 |
| Shrinkage | 1/16" | trace | trace | trace |
| Foam Properties /3/ | | | | |
|   Density, pcf. | 2.2 | 2.0 | 1.98 | 2.1 |
|   Punking Test: | | | | |
|     Initial weight of foam sample, gms. | 73.91 | 65.00 | 64.02 | 68.93 |
|     Burn time, minutes | 5 | 5 | 5 | 5 |
|     Weight after 5 minute burn time, gms. | 57.60 50.30 | 47.00 | 59.08 | |
|     Weight loss after 5 minute burn time, % | 22.1 | 22.6 | 26.6 | 14.3 |
|     Weight 5 minutes after burn time, gms. | 0 | 49.71 | 46.00 | 58.60 |
|     Weight loss 5 minutes after burn time, % | 100 | 23.5 | 28.2 | 15.0 |
|     Final weight (stabilized), gms. | 0 | 50.10 | 46.10 58.61 | |
|   Rating /4/ | Yes | No | No | No |

/1/ Other components are as defined in Table XII.
/2/ Parts by weight per 300 parts by weight of resole.
/3/ Friability resistance (% weight loss) as measured for Foam No. 41, was 16.6, 100 and 100 after 2, 10 and 20 minutes, respectively.
/4/ As previously defined herein, "No" denotes a non punking foam and "Yes" denotes a punking foam.

The results of Table XIII indicate that, whereas control Foam 39 of Run C-13 was rated as a punking foam, Foams 40 to 42 of the invention qualified as non punking foams. Thus, as reflected by the data of Run C-13, control Foam 39 continued to undergo flameless combustion until completely consumed, the rate of punking having been very fast as indicated by a 100 percent weight loss five minutes after the flame had been removed. In contrast to this rapid rate of punking to complete consumption exhibited by the control foam, Foams 40 to 42 of the examples had a final stabilized weight which was substantially the same as the weight of the foam sample immediately after the five minute burn time. For example, in regard to Foam 27 which was produced at one part of Phenylethyl Siloxane B per 100 parts of resole, the weight of the foam sample (1) after the 5 minute burn time, (2) five minutes after the burn time and (3) upon reaching a constant final weight, was 50.30, 49.71 and 50.10, respectively.

EXAMPLES 30 to 32

In accordance with this series of foam preparations and control Run C-14, above-described ion exchanged Resole F was employed as the resole component of the foam forming reaction mixture. As used in this series of foam preparations, Resole F had a water content of 3.52 weight percent. The foams of the examples were produced in the presence of Phenylethyl Siloxane B in an amount of 1, 2 and 3 parts per 100 parts of resole, respectively. In the control run, Siloxane-Polyether Copolymer I was used at 1 part per 100 parts of resole. The other components and relative proportions of ingredients are given in the following Table XIV.

TABLE XIV

FOAM FORMULATION I

| Component | Parts by Weight |
| --- | --- |
| Resole F | 300 |
| Catalyst: Fluoboric acid as a 48 weight percent aqueous solution | 12 |
| Blowing Agent: 1,1,2-Trichloro-1,2,2-trifluroethane | 45 |
| Surfactant: | |
| Phenylethyl Siloxane B | Varied /1/ |
| Siloxane-Polyether Copolymer I | Varied /1/ |

/1/ The particular amounts employed are given in Table XV.

Samples of each foam was subjected to the above-described punking test employing a five minute burn time. The results of this evaluation and the foam reactivity data are given in Table XV which follows.

TABLE XV

| Example No. | — | 30 | 31 | 32 |
| --- | --- | --- | --- | --- |
| Run | C-14 | — | — | — |
| Foam No. | 43 | 44 | 45 | 46 |
| Foam Formulation I /1/ | | | | |
| Surfactant: | | | | |
| Phenylethyl Silocane B /2/ | 0 | 3 | 6 | 9 |
| Siloxane-Polyether Copolymer I /2/ | 3 | 0 | 0 | 0 |
| Cream time, seconds | 55 | 60 | 60 | 60 |
| Rise time, seconds | 115 | 155 | 155 | 160 |
| Gel time, seconds | 80 | 100 | 110 | 110 |
| Rise height, inches | 6.5 | 7.5 | 7.5 | 8 |
| Shrinkage | trace | trace | trace | trace |
| Foam Properties /3/ | | | | |
| Density, pcf. | 1.9 | 1.5 | 1.6 | 1.3 |
| Punking Test: | | | | |
| Initial weight of foam sample, gms. | 64.0 | 36.50 | 52.15 | 44.35 |
| Burn time, minutes | 5 | 5 | 5 | 5 |
| Weight after 5 minute burn time, gms. | 45.5 | 33.10 | 49.30 | 46.5 |
| Weight loss after 5 minute burn time, % | 28.9 | 9.3 | 5.5 | 0 |
| Weight 5 minutes after burn time, gms. | 0 | 33.10 | 49.25 | 46.5 |
| Weight loss 5 minutes after burn time, % | 100 | 9.3 | 5.6 | 0 |
| Final weight (stabilized), gms. | 0 | 33.10 | 49.25 | 46.6 |
| Rating /4/ | Yes | No | No | No |

/1/ Other components are as defined in Table XIV.
/2/ Parts by weight per 300 parts by weight of resole.
/3/ Friability resistance (% weight loss) as measured for Foam No. 45, was 14.6, 69.7 and 100 after 2, 10 and 20 minutes, respectively.
/4/ As previously defined herein, "No" denotes a non punking foam and "Yes" denotes a punking foam.

The results of Table XV indicate that, whereas control Foam 43 of Run C-14 was rated as a punking foam, Foams 44 to 46 of the invention qualified as non punking foams. Thus, as shown by the data of Run C-14, control Foam 43 had lost 100 percent of its weight after only five minutes had elapsed from the time the flame had been removed. In contrast to this very rapid rate of punking to complete consumption exhibited by the control foam, Foams 44 to 46 of the examples had final stabilized weights which were substantially the same as the weight of the respective foam samples immediately after the five minute burn time. For example, as indicated in Table XV for Foam 44, the test foam sample weighed 33.10 grams after the 5 minute burn time and its final stabilized weight was also 33.10 grams.

What is claimed is:

1. A blend of:
   a. a phenolic resole;
   b. an aralkyl-polyalkylsiloxane in which the aralkyl and alkyl groups are bonded to silicon, the alkyl groups have from one to four carbon atoms and the aralkyl groups are of the formula,

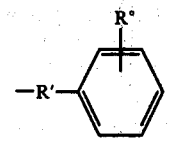

wherein R' is bivalent alkylene having two or three carbon atoms and R° is hydrogen or methyl; and
   c. a halogenated alkane having a boiling point from about minus 40° F. to about 200° F. and in which the halogen substituents are fluorine, chlorine or a combination thereof.

2. A blend as defined in claim 1 in which said halogenated alkane is 1,1,2-trichloro-1,2,2-trifluoroethane.

3. A method for producing phenolic foam which comprises polymerizing a phenolic resole in the presence of an acidic polymerization catalyst, a blowing agent, and an aralkyl-polyalkylsiloxane in which the aralkyl and alkyl groups are bonded to silicon, the alkyl groups have from one to four carbon atoms and the aralkyl groups are of the formula,

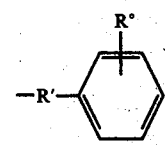

wherein R' is bivalent alkylene having two or three carbon atoms and R° is hydrogen or methyl.

4. a method for producing phenolic foam which comprises polymerizing a phenol-formaldehyde resole in the presence of an acidic polymerization catalyst, a blowing agent and a foam-stabilizing component comprising a phenylethyl-modified polymethylsiloxane oil present in an amount from about 0.1 to about 10 parts by weight per 100 parts by weight of the resole, wherein said phenylethyl-modified polymethylsiloxane oil consists essentially of (i) monofunctional siloxy units the respective silicon atoms of which have two methyl groups bonded thereto, the third silicon-bonded organic group being methyl or phenylethyl, (ii) an average of from about one to about 200 moles of difunctional dimethylsiloxy units for every two moles of said monofunctional units, and (iii) from zero up to an average of about 100 moles, for every two moles of monofunctional units, of difunctional monomethylsiloxy units in which the second organic group bonded to silicon is phenylethyl, provided an average of at least about 0.5 and no more than about 100 moles of phenylethyl groups are present for every two moles of monofunctional units.

5. A method as defined in claim 4 in which the phenol-formaldehyde resole is free of ionic species that respond to removal by the free acid form of a cation exchange resin and the free base form of an anion exchange resin.

6. A phenolic foam produced by the method of claim 5.

7. A method as defined in claim 4 in which the phenol-formaldehyde resole is the product of the method which comprises condensing phenol and formaldehyde in the presence of an alkaline metal catalyst, treating the alkaline condensate with the free acid form of a cationic exchange resin to a pH from 1.5 to about 4, and adding an alkaline compound to the cation exchanged liquid to raise the pH thereof to a value between about 5 and about 6.7.

8. A phenolic foam produced by the method of claim 7.

9. A method as defined in claim 4 in which the resole is the product of the method which comprises condensing phenol and formaldehyde in the presence of an alkaline metal catalyst and neutralizing the alkaline condensate by the addition thereto of an acidic compound.

10. A phenolic foam produced by the method of claim 9.

11. A method for producing phenolic foam which comprises polymerizing and foaming a reaction mixture containing a phenol-formaldehyde resole having a water content of no more than about 10 parts by weight per 100 parts by weight of resole, an acidic polymerization catalyst, a blowing agent, and a foam stabilizing component comprising an aralkyl-polymethylsiloxane oil having the average composition,

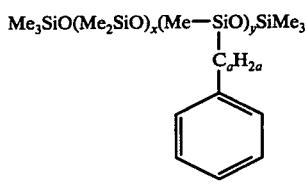

wherein Me is methyl, $a$ has a value of two or three, $x$ has an average value from about 2 to about 80, $y$ has an average value from about one to about 40, and the ratio of $x:y$ has an average value from about 3:1 to about 1:1, said aralkyl-polymethylsiloxane being present in said reaction mixture in an amount from about 0.5 to about six parts by weight per 100 parts by weight of resole.

12. A method as defined in claim 11 in which said aralkyl-polymethylsiloxane oil is present in the reaction mixture in an amount of at least about one part by weight per 100 parts by weight of resole.

13. A method as defined in claim 11 in which the blowing agent comprises 1,1,2-trichloro-1,2,2-trifluoroethane.

14. A method as defined in claim 11 in which the foam stabilizing component additionally comprises a polymethylsiloxane-polyoxyalkylene copolymer wherein the polyoxyalkylene portion of the copolymer is constituted of oxyethylene units or a combination of oxyethylene and oxypropylene units.

15. A method as defined in claim 11 in which the acidic polymerization catalyst comprises an organic sulfonic acid.

16. A method as defined in claim 11 in which the acidic polymerization catalyst is an aqueous inorganic acid.

17. A phenolic foam produced by the method of claim 11.

18. A blend suitable for use in producing phenolic foam which comprises:
   a. a phenolic resole; and
   b. between about 0.1 and about 10 parts by weight, per 100 parts by weight of resole component (a), of an aralkyl-polyalkylsiloxane oil having the average composition,

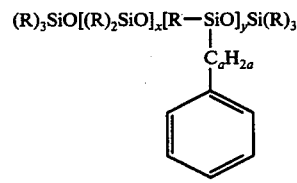

wherein R is alkyl of one to four carbon atoms, $a$ has a value of two or three, $x$ has an average value from about one to about 200, $y$ has an average value from about 0.5 to about 100, and the ratio of $x:y$ has an average value from about 4:1 to about 0.75:1; and
   c. between about 2 and about 40 parts by weight, per 100 parts by weight of resole component (a), of a halogenated alkane having a boiling point from about minus 40° F. to about 200° F. and in which the halogen substituents are fluorine, chlorine or a combination thereof.

19. A blend as defined in claim 18 in which component (c) is 1,1,2-trichloro-1,2,2-trifluoroethane.

20. A blend as defined in claim 18 in which $a$ has a value of two and the R groups are methyl.

21. A blend as defined in claim 18 in which $a$ has a value of three and the R groups are methyl.

22. A blend as defined in claim 18 in which phenolic resole component (a) is a phenol-formaldehyde resole.

23. A blend as defined in claim 18 in which aralkyl-polyalkylsiloxane oil component (b) is present in an amount from about 0.5 to about 6 parts by weight per 100 parts by weight of resole component (a).

24. A blend as defined in claim 18 which additionally contains (d) methyl formate in an amount from about 0.4 to about 20 parts by weight per 100 parts by weight of resole component (a).

25. A blend as defined in claim 18 which additionally contains (d) a polyalkylsiloxane-polyoxyalkylene copolymer in an amount from about 0.5 to about 10 parts by weight per 100 parts by weight of resole component (a).

26. A blend as defined in claim 25 in which said component (d) is a polymethylsiloxane-polyoxyalkylene copolymer having the average formula, $$Me_3SiO(Me_2SiO)_b(MeSiO)_cSiMe_3$$
$$\qquad\qquad\qquad |$$
$$\qquad\qquad C_dH_{2d}(OC_2H_4)_m(OC_3H_6)_nOR^{\circ\circ}$$

wherein: Me is methyl, $R^{\circ\circ}$ is hydrogen or alkyl having from one to four carbon atoms; $b$ has an average value from about 3 to about 100; $c$ has an average value from about 2 to about 10; $d$ has a value from 2 to 4; $m$ has an average value from about 4 to about 30; and $n$ is zero or a positive number having an average value up to about 25.

* * * * *

UNITED STATES PATENT OFFICE
CERTIFICATE OF CORRECTION

Patent No. 4,070,313              Dated January 24, 1978

Inventor(s) Anthony Joseph Papa

It is certified that error appears in the above-identified patent and that said Letters Patent are hereby corrected as shown below:

Column 1, line 24, for "contract" read -- contrast --; line 40, after "as" read -- an --. Column 2, line 64, for "cosist" read -- consist --. Column 3, line 1, for "untis" read -- units --; line 52, for the first occurrence of "of" read -- or --. Column 4, line 46, for "properties" read -- proportions --. Column 5, line 17, for "dialkysiloxay" read -- dialkylsiloxy --; line 37, after "be" read -- any --. Column 7, line 68, for "ae" read -- are --. Column 16, line 43, for "-trifuloroethane" read -- trifluoroethane --. Column 16, line 62, before "that" read -- such --. Column 17, line 48, for "polykylsiloxane" read -- polyalkylsiloxane --. Column 18, line 3, for "akylphenols" read -- alkylphenols --; line 54, for "polyoxyalylene" read -- polyoxyalkylene --. Columns 25-26, Table VI, delete the eighth line from the bottom of the left-hand legends reading "Punking"; Table VI, under column headed "C-6", for the third entry from the bottom reading "5.3" read -- 15.3 --. Columns 27-28, Table VIII, immediately under the second left-hand legend reading "Run No." read -- Foam No. -- and opposite thereto under columns headed "C-7", "12", "13", "14", "C-8", "15", "16" and "17" read the following respective entries -- 18  19  20  21  22  23  24  25 --. Column 28, Table IX, in the title thereof, for "FORMUATIONS" read -- FORMULATIONS --. Column 29, Table IX-continued, in the title thereof, for "FORMUATIONS" read -- FORMULATIONS --. Columns 29-30, Table XI, opposite the left-hand legend reading "Parallel" and under columns headed "C-11", "C-12", "23", "24", "25" and "26" read the following respective entries -- 14.9  36.5  13.2  16.4  15.5  16.3 --; Table XI, opposite the left-hand legend reading "After 10 minutes" and under the last column headed "26", for "96.2" read -- 74.6 --;

UNITED STATES PATENT OFFICE
CERTIFICATE OF CORRECTION

Patent No. 4,070,313　　　　　　Dated January 24, 1978

Inventor(s) Anthony Joseph Papa

It is certified that error appears in the above-identified patent and that said Letters Patent are hereby corrected as shown below:

Table XI, footnote /1/, after "defined" read -- in --.
Column 32, Table XIII, in the sixth line of left-hand legends, for "Phenylethy" read -- Phenylethyl --; Table XIII, opposite the left-hand legend reading "Weight after 5 minute burn time, gms.", under column headed "27" for "47.00" read -- 50.30 --, under column headed "28" for "59.08" read -- 47.00 --, and under column headed "29" read -- 59.08 --; Table XIII, under column headed "C-13", delete the sixth entry from the bottom reading "50.30"; Table XIII, under column headed "28", delete the next to last entry reading "58.61"; Table XIII, opposite the left-hand legend reading "Final weight (stabilized), gms." and under column headed "29" read -- 58.61 --. Column 33, Table XV, in the sixth line of left-hand legends, for "Silocane" read -- Siloxane --. Column 34, line 65, for "a" read -- A --.

Signed and Sealed this

Eighth Day of August 1978

[SEAL]

Attest:

RUTH C. MASON
Attesting Officer

DONALD W. BANNER
Commissioner of Patents and Trademarks